United States Patent [19]

Olhausen, Jr.

[11] 4,442,491

[45] Apr. 10, 1984

[54] TRAINING EVALUATION PROCESS

[75] Inventor: James N. Olhausen, Jr., Benbrook, Tex.

[73] Assignee: General Dynamics Corporation, Fort Worth, Tex.

[21] Appl. No.: 276,650

[22] Filed: Jun. 23, 1981

[51] Int. Cl.³ .............................................. G06F 15/20
[52] U.S. Cl. .................................... 364/454; 364/571; 434/30
[58] Field of Search ....................... 364/423, 454, 571; 434/30, 43, 44

[56] References Cited

U.S. PATENT DOCUMENTS

| | | | |
|---|---|---|---|
| 3,636,323 | 1/1972 | Salisbury et al. | 364/423 X |
| 3,940,597 | 2/1976 | DiMatteo | 364/454 X |
| 4,168,524 | 9/1979 | Soltz et al. | 364/454 X |
| 4,254,465 | 3/1981 | Land | 364/454 X |
| 4,303,978 | 12/1981 | Shaw et al. | 364/454 X |

Primary Examiner—Jerry Smith
Attorney, Agent, or Firm—Arthur F. Zobal

[57] ABSTRACT

An air training evaluation process which corrects the position and velocity sensed by an aircraft's inertial navigation system (INS) to obtain more accurate data on the aircraft's position during an engagement.

In carrying out the process the aircraft's on-board INS system is employed to obtain pre-flight data on position and velocity, data on position and velocity during the engagement, and post-flight data on position and velocity. The pre-flight data on position and velocity and the post-flight data on position and velocity are compared with independently determined data on the pre-flight position and velocity of the aircraft and with independently determined data on the post-flight position and velocity of the aircraft respectively to obtain pre-flight error functions and post-flight error functions on position and velocity. These functions and the known time variant drift characteristics of position and velocity of the INS are employed to derive position and velocity correction functions during the time of the engagement. The position and velocity correction functions are employed to correct the INS data on position and velocity during the engagement. The corrected data then are employed to display post-flight, a more accurate position of the aircraft during the engagement relative to background portrayals of features or terrain on the earth.

During an engagement of two or more aircraft, aircraft-to-aircraft or aircraft-to-ground corrections may be made to the corrected INS data post-flight for further enhancement of accuracy of the INS data.

23 Claims, 12 Drawing Figures

TRAINING EVALUATION PROCESS

BACKGROUND OF THE INVENTION

1. Field of Invention

A process of acquiring, analyzing, and displaying information on the results of maneuvers carried out by one or more vehicles engaged in a training mission.

2. Description of the Prior Art

Shortly after military aircraft training maneuvers are carried out, it is desirable to play back the training exercises in understandable form, to the participating aircrews, to permit objective analysis by the aircrews of their performance and the results of the maneuvers they executed during the flight while that flight is still fresh in their minds. Several systems have been employed to acquire, analyze and play back information on the results of maneuvers flown by military aircraft engaged in air training exercises. The systems known to me are the Navy Air Combat Maneuvering Range (ACMR) and the Air Force Air Combat Maneuvering Instrumentation System (ACMI). These systems, however, have to rely on large instrumented ranges, sophisticated tracking systems, and extensive computer facilitites to allow acquisition and display of information on each aircarft as it maneuvers. This, in turn, means that there is a large investment in land, equipment, and manpower necessary to support ACMR and ACMI ranges. In addition, aircraft, aircrews, and support equipment and personnel must be transported to and from their squadron bases to use those ranges.

SUMMARY OF THE INVENTION

It is an object of the present invention to provide a new and lower cost training evaluation process and system.

It is another object of the present invention to provide a training evaluation process which corrects the position sensed by a vehicle's inertial navigation system (INS) to obtain more accurate data on the vehicle's position during a mission.

It is a further object of the present invention to provide an air training evaluation process which corrects the position sensed by an aircraft's inertial navigation system (INS) to obtain more accurate data on the aircraft's position during flight.

The process and system of the present invention is autonomous and when employed in connection with aircraft, does not require the complex real-time ground-based tracking and data acquisition systems of the prior art to follow the aircraft during flight. As a result, the process and system of the present invention is a lower cost process and system that can be used virtually anywhere, on land or sea.

In carrying out the preferred embodiment of the process of the present invention in connection with aircraft, the aircraft's on-board INS system is employed to obtain pre-flight data on position and velocity, data on position and velocity during an engagement, and post-flight data on position and velocity. The pre-flight data on position and velocity and the post-flight data on position and velocity are compared with independently determined pre-flight data on position and velocity of the aircraft and with independently determined post-flight data on position and velocity of the aircraft respectively to obtain pre-flight error functions on position and velocity and post-flight error functions on position and velocity. These functions and the known general time variant drift characteristics of the INS are evaluated post-flight to derive specific position and velocity correction functions, which are then employed to correct the INS data on position and velocity obtained during the flight. The corrected data then are employed to display post-flight, a more accurate position of the aircraft during the engagement relative to other aircraft, background protrayals of features, or terrain on the Earth.

During an engagement of two or more aircraft, aircraft-to-aircraft or aircraft-to-ground corrections may be made to the corrected INS data post-flight for further enhancement of accuracy of the INS data.

It is to be understood that the process of the present invention can also be used for other vehicles that carry inertial navigational systems during training operations such as naval surface vessels, submarines, spacecraft, etc.

DESCRIPTION OF THE PREFERRED EMBODIMENTS

In the present application, the terms vehicle, base, mission, maneuver, pre-mission, post-mission, pre-engagement, and post-engagement are defined as follows. Vehicle is defined as any movable object that carries an Inertial Navigation System on board. Examples are certain types of aircraft, naval vessels, and spacecraft. Base is defined as the site(s) or facility(ies) from which missions are conducted. The base may be stationary (such as an airfield) or moving (such as an aircraft carrier). Mission is defined as the entire series of occurrences that take place after leaving a base but prior to returning to it or to another base. Maneuver (or event) is defined as one of a series of exercises or tasks done and recorded during a mission. Engagement is defined as the entire set of exercises done during a mission. Pre-mission is defined as any occurrences that take place before a vehicle leaves a base to conduct a mission. Post-mission is defined as any occurrences that take place after a vehicle arrives at a base after conducting a mission. Pre-engagement is defined as any occurrences that take place pre-mission or during the mission, prior to the start of the first maneuver. Post-engagement is defined as any occurrences that take place post-mission or during the mission, after the end of the last maneuver. The present invention is applicable to training missions carried out by vehicles such as aircraft, naval vessels and spacecraft. The present invention will be described in detail in connection with training missions carried out by aircraft. When the above terms are applied specifically to aircraft, the term flight is taken to mean the same as the term mission. In addition, pre-flight is defined as any occurrences that take place before an aircraft leaves a base to conduct a flight and post-flight is defined as any occurrences that take place after an aircraft arrives at a base after conducting a flight.

Figure 1:
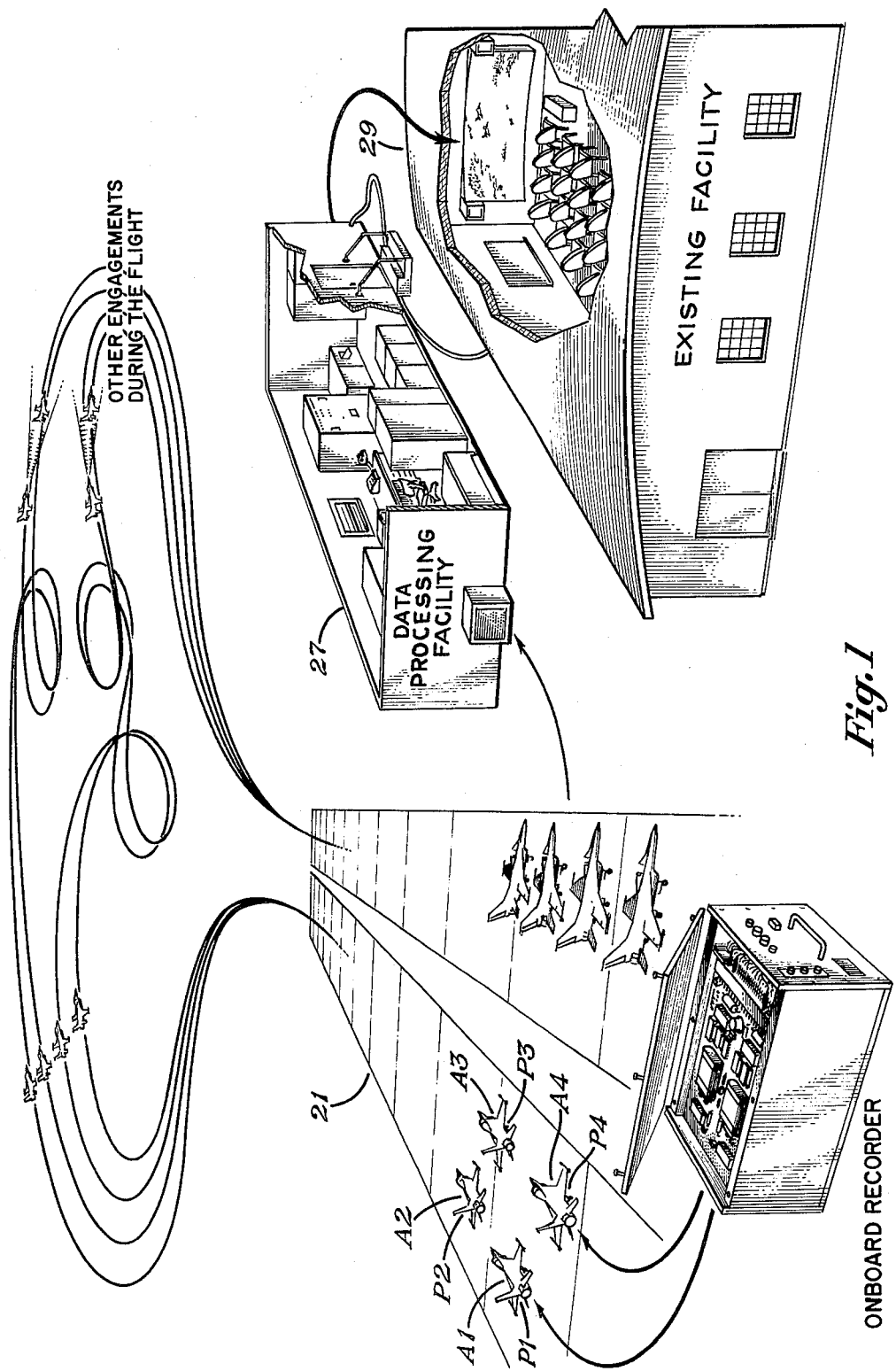
FIG. 1 illustrates the sequence in which data is recorded by aircraft during training missions, processed for correction, and then displayed for debriefing purposes.
Figure 2:
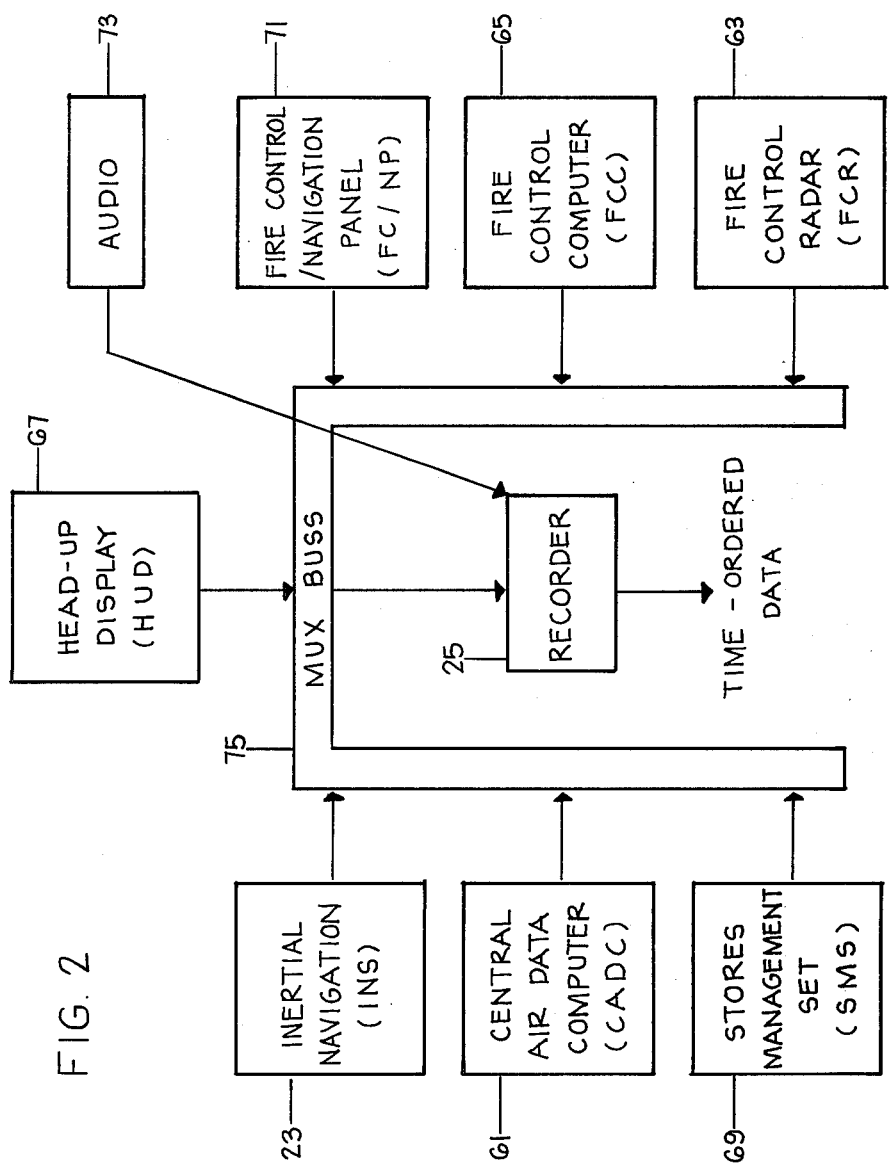
FIG. 2 is a block diagram of the instrumentation recorder system carried by each aircraft and the production avionics that provide it with information.

Referring now to FIGS. 1-4 of the drawings, there will be described the process and system of the present invention in connection with training missions carried out with aircraft. In FIG. 1, one or more aircraft A1-A4 are shown parked on a runway 21. Each aircraft is parked on a numbered position P1-P4. The location of each of these positions in latitude, longitude, and altitude is known within a few feet from prior surveys. Referring to FIG. 2, each aircraft carries a number of instruments including an inertial navigation system (INS) 23 and a data recorder 25. Each INS measures a number of parameters including elapsed time after it is started; information on position; and information on velocity. This information is recorded by the recorder 25 in digital form in a time-ordered sequence.

When the pilots enter the aircraft, they each type into their onboard navigation systems the coordinates of their positions. Each navigation system assumes these coordinates are the aircrafts current location. This information serves to initialize the navigation system (INS) so that it will compute proper position of the aircraft throughout the flight. Each aircraft's INS will be on continuously from prior to take-off to a time after the aircraft has landed.

Once the aircraft avionics are operating properly, but prior to taxiing out for take-off, one or more short sets of data from the onboard systems are obtained by turning on the recorder to record the aircraft navigation system (INS) data on position. This pre-flight information is used in post-flight processing to determine where the aircraft navigation system "thought" the aircraft was and to compare that with the known position coordinates of the aircraft's parked location. Also recorded pre-flight is the INS data on velocity. Subsequent data sets prior to take off enhance knowledge of INS velocity errors.

After the aircraft take-off, they proceed to the air-to-air maneuver area. While they are in flight formation prior to entering the maneuver area, the "lead" pilot turns on his recorder and pushes a button which causes the recorder to send out, over the pilot radio audio channel, a coded tone that is received by the recorder(s) on the other aircraft. This tone causes all recorders to go into fast record mode to produce adequate data for good display playback realism, and also serves to synchronize that recorder's clock with the one on the lead aircraft. In the formation flight, the relative positions between the lead aircraft and the other aircraft are known or determined either by a pre-arranged spacing between the aircraft or by the use of radar. The pilots remain in formation flight for a short period of time prior to starting the air-to-air exercise. The above procedure of obtaining the relative positions between the lead aircraft and the other aircraft is defined as a calibration procedure and preferably is carried out before a maneuver although it could be carried out after such a maneuver or at both ends of that maneuver.

Once the calibration procedure is completed, the aircraft can proceed with the maneuvers, which can involve any type of maneuvering desired and can last over periods of time up to approximately ten minutes. For example, the two aircraft may perform an exercise where one serves as a "target", i.e. in a defensive role, for the other aircraft, the attacker. The target aircraft may perform a variety of maneuvers, such as hard turns and rapid rolls, during the course of the engagement in an effort to "shake" the attacking aircraft. The attacker may get in several situations where he feels he has a good missile shot opportunity at the defender. At those times, he presses the weapon release button to simulate the firing of an actual missile. This information is relayed to the recorder via the aircraft avionics data buss. During the calibration procedure and during the exercise maneuvers, data on position and velocity from the inertial navigation system (INS) of each aircraft is recorded.

When the maneuver sequence is over, the lead aircraft pilot selects low data rate on his recorder, which generates a tone via radio that is received by the recorder(s) in the other aircraft, causing it (them) also to revert to normal (slow) record mode.

The aircraft then may press on and do other air-to-air events during the flight, repeating the calibration procedure either at the beginning or the end of each maneuver sequence, or both.

Once the aircraft have completed the objectives of the flight, they return to base, land, and taxi back to the aircraft parking area. Each pilot parks his aircraft over one of the surveyed parking positions, preferably the one he started the flight from. Once the aircraft is stopped, but prior to shutting down the avionics systems, each pilot turns on his recorder for a few moments to record post-flight a plurality of sets of navigation system (INS) data on position and velocity. He then turns off the recorder, shuts down the aircraft, removes the recorder cassette from the aircraft, and turns it in at the post-flight processing site 27 as he heads for post-flight maintenance debriefing at a debriefing facility 29.

The personnel in the processing center take the aircraft cassettes and insert them into devices which read the data from the cassettes and begin post-flight processing to analyze, correlate, and correct each set of data. The processing personnel also, via a keyboard, load into the processing system supplemental information, such as pilot name, aircraft tail number, where each aircraft was parked pre and post-flight, etc. This information, along with each aircraft's data, serves as the basis for generation of the post-flight mission debriefing displays.

The processing essentially begins with the correction of long-term navigation system errors during the flight by comparing the INS recorded aircraft position pre-flight and post-flight with the known position of the parking slots the aircraft used pre-flight and post-flight and a model of the INS position error trend as a function of time during flight is computed. Also computed is a model of the INS velocity error trend as a function of time during flight. These comparisons and computations will be described in detail subsequently. These models then are used to correct the INS data obtained from the aircraft during the flight to obtain the aircraft's corrected position and velocity relative to local terrain and other aircraft.

In addition, in order to enhance relative aircraft-to-aircraft positional accuracy during certain periods of time inflight (when the calibration procedure was performed), another correction procedure can be used. Since the position of a second aircraft relative to a lead or reference aircraft can be determined by the known formation or by radar at the time of the calibration procedure, the information from the navigation system in the second aircraft can be evaluated to determine where it "thought" it was (after the corrections of its long-term navigation system errors during the flight have been made) as compared to its known location relative to the lead aircraft. The difference in position derived from this comparison is the relative error in the second aircraft's navigation system. Post-flight, this error can be corrected out of that aircraft's data (after correcting for the long-term errors) throughout the air-to-air engagement, thus greatly enhancing the accuracy of relative aircraft position.

If the aircraft involved in the calibration procedure stay in formation for a period of time after the recorders are on, velocity error trends in the navigation systems, as well as position errors, can be evaluated and corrected out of the second aircraft's data. This further enhances relative position accuracy from the air-to-air engagement.

Other types of processing occur for each aircraft, such as processing to insure time synchronization of data between the aircraft, generation from stored data of the topography of the ground the aircraft flew over, formatting of tabular data for later display, etc. After all this processing has been done, the information is passed to a large-scale memory storage device on an event-by-event basis. Typical processing time to accomplish this task is between fifteen and thirty minutes.

Once the aircrews have completed their aircraft maintenance debriefing, they assemble in one of the squadron debriefing rooms to review, in detail, the training activities they engaged in during the just-concluded flight in order to derive the maximum benefits (lessons learned) from them.

Figure 4:
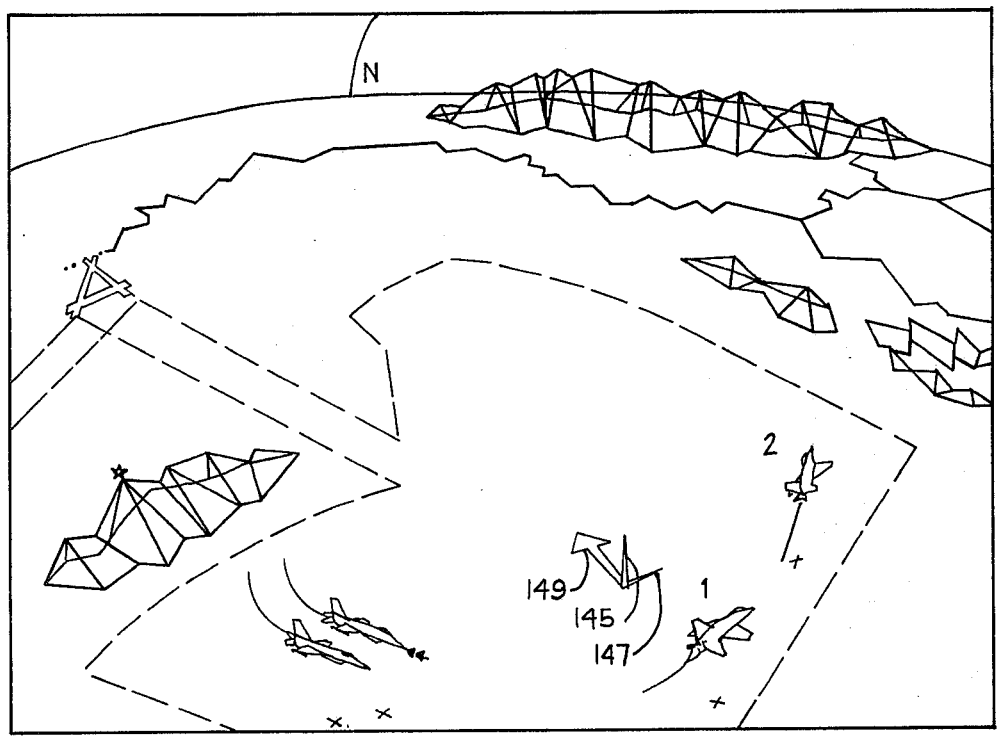
FIG. 4 is a pictorial display of aircraft maneuvers for debriefing purposes.

This is accomplished by using an interactive debriefing display system. This system permits the aircrews to call up and display selected portions of the training flight on a computer-generated cathode ray tube display or large screen display, which can present both pictorial and numeric information. FIG. 4 is a pictorial display of four aircraft at one instant of time during an engagement. The display shows, in line form, the accurate positions of the aircraft relative to each other and relative to known terrain.

The operation of the interactive debriefing display system is controlled by the lead pilot by means of a control panel situated in the debriefing room. This panel gives the pilot control of: which engagement is being presented; the orientation of the viewer to the overall pictorial scene; forward or reverse viewing of the scene at selectable speeds; selection of any one of several tabular display formats; zoom in and zoom out; audio playback; overall scene or view from any cockpit; and whether or not the scene being presented will also be recorded on video tape.

The display system functions by using a computer, under interactive control from the pilot, to retrieve data from the mass storage devices mentioned earlier. This computer then formats these data and generates a visual image of them in both pictorial and alphanumeric formats for display.

The display system has the capability to show the debriefing pilots where they were, where the other aircraft were, and their relationship to the ground and significant terrain features. This type of display enhances the pilot's ability to comprehend the overall tactical situation and evaluate the development of each engagement to determine the reasons for the end results, good or bad. This evaluation leads directly to the assessment of current tactics and development of new tactics, greatly enhancing the combat effectiveness of each pilot.

Many additional display capabilities are available to further enhance the benefits of the debriefing displays. These include the following: (a) The capability to continuously monitor and display whether each pilot is flying his aircraft within its pre-defined safe maneuver limits. (b) The probable result (hit or miss) if an air-to-air missile were launched at a certain time from one aircraft against another. This includes the capability to continuously evaluate whether the aircraft was flying within the acceptable dynamic launch envelope of that missile. (c) The location on the terrain of significant simulated or actual targets, ground-to-air missile sites, etc. (d) The ability for the debriefing pilot to "takeover" one of the aircraft during a replay of inflight data to show how alternate maneuvers or tactics might have affected the outcome of the engagement. This is done by replacing the inflight data from the aircraft being "re-flown" with simulated flight data generated by the display system computer controlled, via the interactive devices, by the debriefing pilot. (e) The capability to permanently record on vidio tape the scenes generated in the debriefing. This tape can then be used later on as a mission memory refresher and as a teaching tool for new or inexperienced pilots. (f) The ability to preserve the stored data used to generate the displays for later use to, again, interactively debrief that flight.

Figure 3:
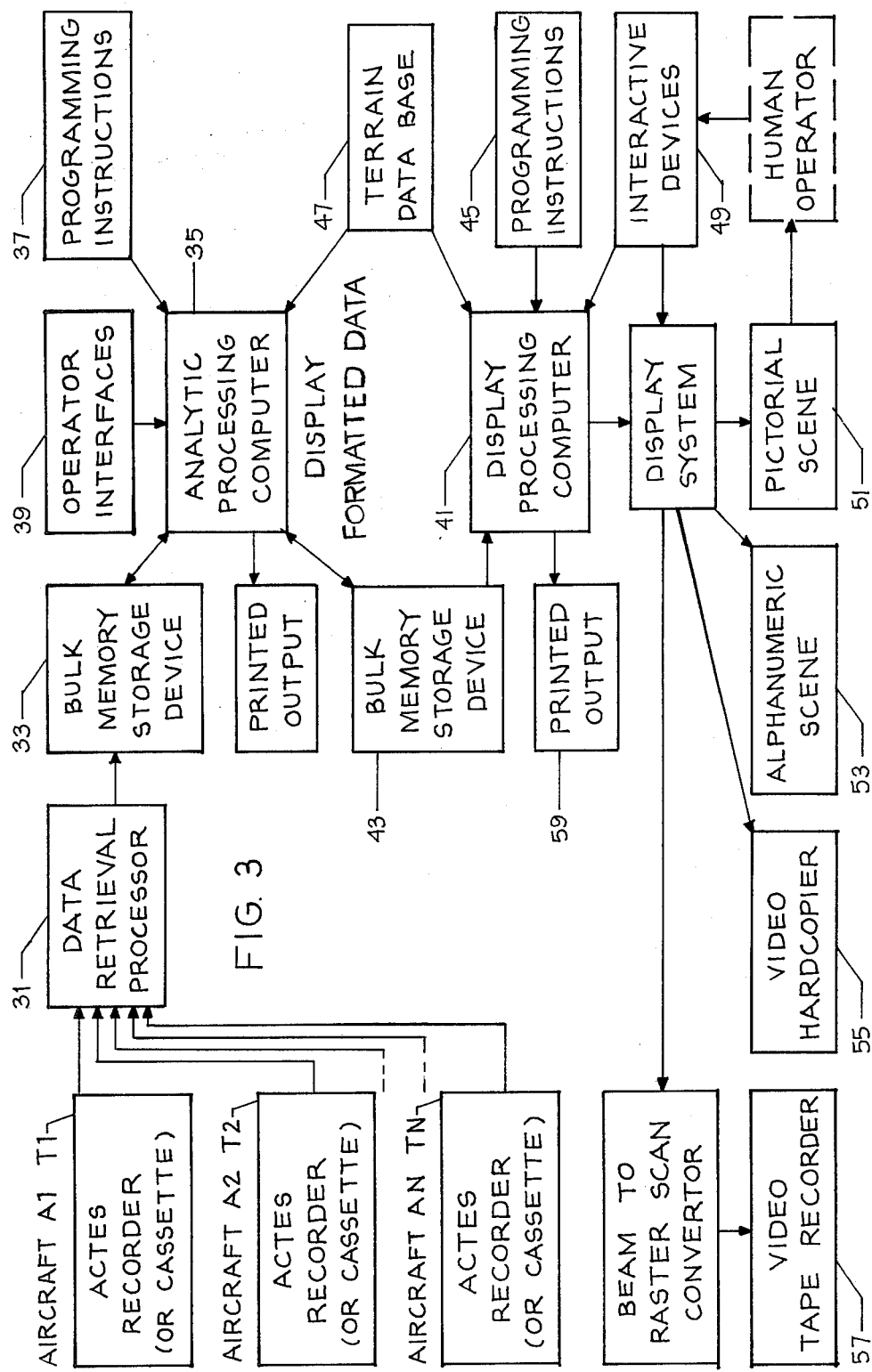
FIG. 3 is a block diagram of post-flight processing.

FIG. 3 illustrates functionally how the recorded information is manipulated after the flight to produce the displays of information in pictorial and alphanumeric form used by the aircrews to debrief the just-completed mission.

The data recorded by aircraft A1, A2, AN on tapes T1, T2, TN, is made available to the postflight processing system through a Data Retrieval Processor (31), which controls the passage of data from the recorders, or data cassettes, to the analytic processing system. The data can then be placed on a bulk memory storage device 33, for intermediate storage or can be passed directly onto the analytic processing computer 35. This computer is programmed with special processing instructions (a system of software instructions indicated at 37). For certain applications, it is desirable to have interfaces available so that a human operator can interface with the processing computer, as shown at 39.

The analytic computer performs several necessary operations on the aircraft data prior to making it available to the display processing computer 41, via the bulk memory storage device 43, which may be the same physical component as device 33.

As indicated above, the analytic computer 35 corrects aircraft inertial navigation data by analyzing the pre and post-flight inertial data where each aircraft is parked relative to the ground. An absolute inertial knowledge of the latitude and longitude where the aircraft is parked as compared to the Inertial Navigation System's (INS) internally-computed position provides the pre and post-flight errors in each horizontal axis that the INS is currently exhibiting. Outputs of INS velocities supply the trends (derivatives) of those errors as a function of time. These data are then analyzed using coefficient extraction routines to establish the linear and non-linear (including Schuler sinusoidial oscillations) time-variant drift characteristics of each INS during the just-concluded flight. Further processing then corrects the INS position and velocity data recorded inflight by correcting out the modeled errors calculated from pre and post-flight INS error characteristics. This process permits dramatic improvements in the accuracy of INS data available for post-flight presentation to the pilots.

For higher relative aircraft-to-aircraft positioning accuracy during flight, additional upgrading preferably is carried out as indicated above. This is achieved by the pilots flying in formation with their recorders on for a short time before, after, or at both ends of a training maneuver of interest to determine the relative positions between the other aircraft and the lead aircraft. Air-to-air radar also can be employed to obtain this information. These data can be analyzed post-flight and the output of each aircraft's INS, after it has been corrected with the modeled errors determined from pre and post-flight INS error characteristics as outlined above, is compared to its known position relative to the designated "lead" aircraft. Errors in each of the other aircraft's position information can thus be detected relative to the "lead" aircraft and corrected out of each of the other aircraft's INS data during the course of the training engagement. This method of high accuracy data correction permits accurate relative aircraft positioning over significant periods of time.

Other analytic processing tasks that are performed synchronize the outputs of all of the aircrafts' recorders, do aircraft calculations, terrain correlations, simulated missile fly-out computations, and format the resultant data for output to the bulk memory storage device 43.

The display processing computer 41, using software programming instructions, indicated at 45, processes the inputs from: the bulk memory storage device 43; the terrain data base 47; and interactive devices 49, and constructs pictorial and alphanumeric presentations of recorded aircraft data and presents them on display devices 51 and 53 respectively, which may be television screens or large screen displays, for the aircrew to use in post-flight debriefing. The data can be output in a wide variety of other formats; such as a hardcopier 55, a video tape recorder 57, or an alphanumeric printer 59. Large screen displays produce the display on a screen by light image projection. Such units are available commercially, for example, from a company by the name of Xytron.

The INS employed may be a military or commercially available unit having a gimbled platform. Units of this type may be purchased from Singer-Kearfott, Delco, or Litton. The preferred outputs of the aircraft avionics systems are set forth in Table 1.

TABLE 1

| SIGNAL SOURCE | PARAMETER |
| --- | --- |
| INS | Time |
| INS | Vel. X |
| INS | Vel. Y |
| INS | Vel. Z |
| INS | Roll |

TABLE 1-continued

| SIGNAL SOURCE | PARAMETER |
| --- | --- |
| INS | Pitch |
| INS | True Heading |
| INS | Accel. X |
| INS | Accel. Y |
| INS | Accel. Z |
| INS | CXX |
| INS | CXY |
| INS | CXZ |
| INS | Longitude |
| INS | Altitude |
| CADC | Altitude |
| CADC | TAS |
| CADC | MACH |
| CADC | CAS |
| CADC | Angle-of-Attack |
| Radar | Radar Mode Word |
| Radar | Slant Range |
| Radar | Range Rate |
| Radar | Antenna Azimuth |
| Radar | Antenna Elevation |
| Radar | Rel. Target X Pos. |
| Radar | Rel. Target Y Pos. |
| Radar | Rel. Target Z Pos. |
| Fire Control Computer | Normal Accel. |
| Fire Control Computer | Height Above Target |
| Fire Control Computer | Weapon Release |
| Fire Control Computer | Sideslip |
| HUD | Roll Rate |
| HUD | Pitch Rate |
| HUD | Yaw Rate |
| Stores Management System | SMS Mode Word |
| Stores Management System | Delivery Mode |
| Stores Management System | Weapon Select |
| Stores Management System | Rounds Remaining |
| Stores Management System | Station Select |
| Data Buss Outputs | Fuel Weight |
| Data Buss Outputs | Fuel Burn Rate |
| Data Buss Outputs | Throttle |
| Data Buss Outputs | Gear-up |

As mentioned previously, the INS measures elapsed time after it is set into operation. It also measures its platform velocity in the X, Y, and Z directions. These velocities are converted post-flight into aircraft velocities in the North, East, and down directions, respectively. The INS additionally measures roll, pitch, and true heading of the aircraft with respect to the Earth, acceleration in the X, Y, and Z directions, the direction cosines CXX, CXY and CXZ, longitude, and altitude. The X, Y, and Z components of acceleration are those of the platform of the INS. They are converted post-flight to aircraft acceleration in the North, East and down directions. The direction cosines are the angles between the INS and a reference latitude and longitude, and are employed to determine latitude post-flight. Thus the INS measures data which gives a three dimensional position of the aircraft with respect to the Earth.

Each INS has drift or error characteristics of position and velocity which vary as a function of time. The error characteristics of position in latitude and longitude have a linear, sinusoidal, and exponential component. The error characteristics of velocity in the horizontal axes have a sinusoidal component and a linear component. The sinusoidal component of both the position and velocity error has a period of about 84 minutes and is known as the Schuler frequency.

Errors in INS altitude measurements are small. These errors will be described subsequently.

The position and velocity errors in an inertial navigation system (INS) during normal operation can be approximated by a set of non-linear equations which describe error trends in the horizontal axes as functions of time.

Letting $\Delta POS_N$ represent position error of the INS in the north direction, $\Delta POS_E$ represent position error of the INS in the east direction, $\Delta V_N$ represent INS velocity error in the north direction, and $\Delta V_E$ represent INS velocity error in the east direction, the error equations are:

$$\Delta POS_N = K_1 + K_2 t + K_3 t^2 + (180/\pi) K_4 \cos \omega_s(t - K_5) \quad (1)$$

$$\Delta POS_E = K_6 + K_7 t + K_8 t^2 + (180/\pi) K_9 \cos \omega_s(t - K_{10}) \quad (2)$$

$$\Delta V_N = K_2 + 2K_3 t - K_4 \omega_s \sin \omega_s(t - K_5) \quad (3)$$

$$\Delta V_E = K_7 + 2K_8 t - K_9 \omega_s \sin \omega_s(t - K_{10}) \quad (4)$$

where $\omega_s$ is the Schuler frequency in degrees per second and t is elapsed time in seconds since the first pre-flight INS data was obtained.

The values of the K coefficients shown in equations (1) through (4) are not known prior to flight because they vary nonpredictably from INS to INS and from flight to flight.

Figure 5:
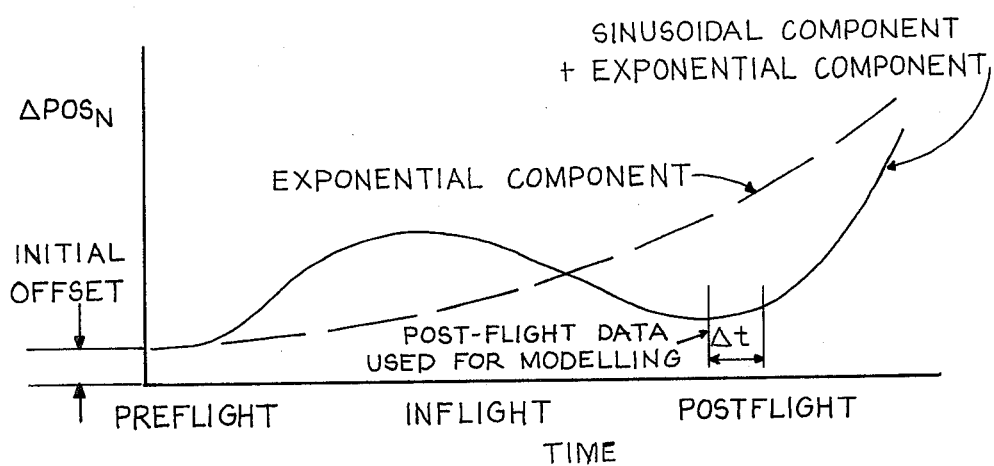
FIGS. 5 and 6 are diagrams of INS error as a function of time.
Figure 6:
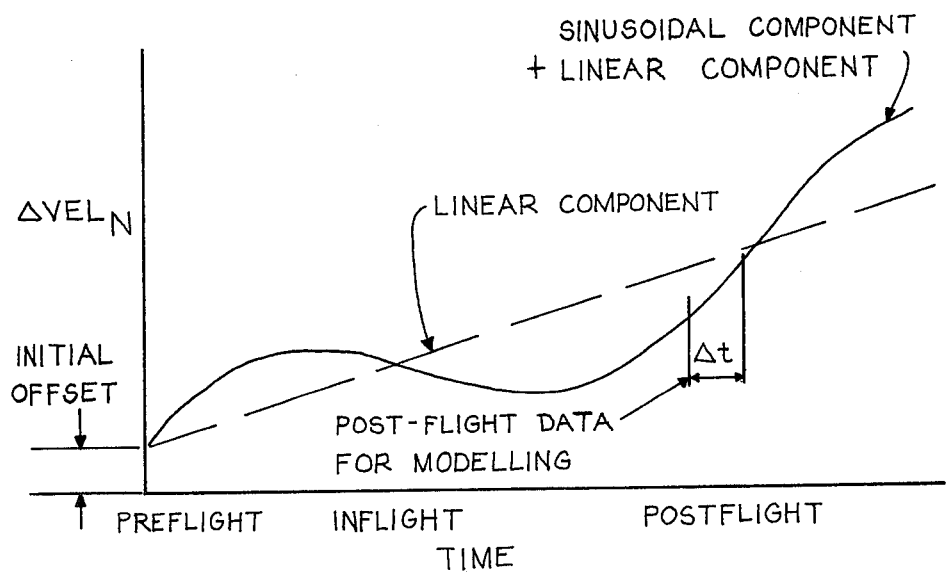

The diagrams of FIGS. 5 and 6 illustrate the general form of the INS position and velocity errors in one of the horizontal axes during a typical mission. In FIG. 5 the initial offset in position is a function of $K_1$, $K_4$, and $K_5$. In FIG. 6, the initial offset in velocity is a function of $K_2$, $K_4$, and $K_5$. Errors in the other horizontal axis will take the same general form.

Equations (1), (2), (3), and (4) are employed to compute models of the INS position and velocity errors as a function of time. These models then are used to correct INS data obtained from the aircraft during the flight. In the following example, INS data on position and velocity are measured pre-flight and post-flight with the aircraft on the ground parked over known positions, respectively. Pre-flight (with the aircraft parked over a known position), the INS data of Position N, Position E, Velocity N and Velocity E are measured and recorded for a short interval of time. The errors $\Delta POS_N$, $\Delta POS_E$, $\Delta V_N$, and $\Delta V_E$ are determined by finding the difference between: the INS pre-flight measured position north and the actual pre-flight position north; the INS pre-flight measured position east and the actual pre-flight position east; the INS pre-flight measured velocity north and the actual pre-flight velocity north; and the INS pre-flight measured velocity east and the actual pre-flight velocity east, respectively. In this example, the actual pre-flight velocity north and east will be zero. Post-flight (after the aircraft has flown its mission, landed, and parked over a known position) INS data of Position N, Position E, Velocity N, and Velocity E are measured and recorded during three known time intervals $\Delta t$ starting at three different known times t respectively. In FIGS. 5 and 6 only one time interval $\Delta t$ is illustrated. Each time interval is relatively short compared with the elapsed time since the INS was first turned on preflight. At each time interval $\Delta t$, the time t is known. For each time interval, $\Delta POS_N$, $\Delta POS_E$, $\Delta V_N$ and $\Delta V_E$ are calculated by finding the difference between: the INS post-flight measured position north and the actual post-flight position north; the INS post-flight measured position east and the actual post-flight position east; the INS post-flight measured velocity north and the actual post-flight velocity north; and the INS post-flight measured velocity east and the actual post-flight velocity east, respectively. In this example, the actual post-flight velocities north and east will be zero.

There are a total of 10 unknown coefficients. During the time of a given training mission, all coefficients are considered to be constant for any one aircraft. By determining $\Delta POS_N$, $\Delta POS_E$, $\Delta V_N$ and $\Delta V_E$ at one pre-flight time and at three different known post-flight times t, respectively, four data sets of the two equations (3) and (4) can be employed for determining the four coefficients $K_4$, $K_5$, $K_9$, and $K_{10}$. Once these coefficients have been determined, the equations (1) and (2) can be solved simultaneously to obtain the remaining coefficients; $K_1$, $K_2$, $K_3$, $K_6$, $K_7$, and $K_8$. Mathematical solutions for these coefficients are presented in equations 5–39. Calculation of all of the coefficients is carried out by the analytic processing computer using the coefficient extraction subroutine presented in equations 5–39. If more than four unique sets of data are available post-flight, multiple solutions for the linear and non-linear coefficients values can be made and statistically averaged to obtain a more precise model of INS error characteristics.

Once the INS error coefficients have been determined equations (1), (2), (3), and (4) can be used to determine the INS position and velocity errors, $\Delta POS_N$, $\Delta POS_E$, $\Delta V_N$, $\Delta V_E$, anytime in flight. Having determined the INS modeled position and velocity errors during flight, they can be corrected out of the INS position and velocity data recorded during flight to substantially improve the accuracy at which the INS knows position. In this respect, at each time during flight: $\Delta POS_N$ for that time is corrected out of the INS measured Position (N) at that time; $\Delta POS_E$ for that time is corrected out of the INS measured Position (E) at that time; $\Delta V_N$ for that time is corrected out of the INS measured Velocity (N) at that time; and $\Delta V_E$ for that time is corrected out of the INS measured Velocity (E) at that time. The mathematical signs of the INS position and velocity errors may be plus or minus. Thus the position and velocity errors are corrected out of the INS position and velocity data respectively recorded during flight by subtracting or adding the INS position and velocity errors from or to the INS position and velocity data respectively recorded during flight. The resultant output are corrected positions and velocities as a function of time throughout the period of each engagement of the aircraft. The modeled error reduces average inflight position error to approximately 1/5 of its uncorrected value; depending on the particular type of navigation platform being used and its uncorrected accuracy at the end of a particular flight. For general training work, such as low-level navigation, the above process for correcting error using equations (1), (2), (3) and (4) can be used to position each aircraft within approximately 500 to 1,000 feet of the actual position. This provides adequate accuracy for many types of missions. In actual practice, the aircraft recorder will be kept operating throughout the flight so that if inflight INS position updates are made, they can be recorded as they occur and compensated for in post-flight processing. Such INS updates are well known standard procedures made inflight to increase the accuracy of INS present position.

Preferably the modeled errors of position and velocity will be corrected out of the recorded INS data on position and velocity during the entire engagement, however, it is to be understood that the modeled errors of position and velocity may be corrected out of the recorded data on position and velocity only during selected maneuvers of an engagement.

Equations 5-39 are as follows:

$$A = \frac{\Delta V_{N2} - \Delta V_{N1}}{2(t_2 - t_1)} \tag{5}$$

$$B = \frac{\omega_s(\sin\omega_s t_1 - \sin\omega_s t_2)}{2(t_2 - t_1)} \tag{6}$$

$$C = \frac{\omega_s(\cos\omega_s t_2 - \cos\omega_s t_1)}{2(t_2 - t_1)} \tag{7}$$

$$D = \frac{\Delta V_{N3} - \Delta V_{N1}}{2(t_3 - t_1)} - A \tag{8}$$

$$E = \frac{\omega_s(\sin\omega_s t_1 - \sin\omega_s t_3)}{2(t_3 - t_1)} \tag{9}$$

$$F = \frac{\omega_s(\cos\omega_s t_3 - \cos\omega_s t_1)}{2(t_3 - t_1)} \tag{10}$$

$$G = \frac{\Delta V_{N4} - \Delta V_{N1}}{2(t_4 - t_1)} - A \tag{11}$$

$$H = \frac{\omega_s(\sin\omega_s t_1 - \sin\omega_s t_4)}{2(t_4 - t_1)} \tag{12}$$

$$I = \frac{\omega_s(\cos\omega_s t_4 - \cos\omega_s t_1)}{2(t_4 - t_1)} \tag{13}$$

$$K_5 = \frac{\tan^{-1}\frac{(G(E-B) + D(B-H))}{(D(I-C) + G(C-F))}}{\omega_s} \tag{14}$$

If $K_5 \leq 0$ and numerator in (14) is $>0$;
$K_5 = K_5 + 180/\omega_s$ \hfill (15)

If $K_5 > 0$ and numerator in (14) is $\leq 0$;
$K_5 = K_5 - 180/\omega_s$ \hfill (16)

$$K_4 = \frac{D}{(E-B)\cos\omega_s K_5 + (F-C)\sin\omega_s K_5} \tag{17}$$

$K_3 = A - K_4(B\cos\omega_s K_5 + C\sin\omega_s K_5)$ \hfill (18)

$K_2 = \Delta V_{N1} - 2K_3 t_1 + K_4 \omega_s \sin\omega_s(t_1 - K_5)$ \hfill (19)

$K_1 = \Delta POS_{N4} - K_2 t_4 - K_3 t_4^2 - (180/\pi)(K_4 \cos \omega_s(t_4 - K_5))$ \hfill (20)

In the East direction:

$$P = \frac{\Delta V_{E2} - \Delta V_{E1}}{2(t_2 - t_1)} \tag{21}$$

$$Q = \frac{\Delta V_{E3} - \Delta V_{E1}}{2(t_3 - t_1)} - P \tag{22}$$

$$R = \frac{\Delta V_{E4} - \Delta V_{E1}}{2(t_4 - t_1)} - P \tag{23}$$

$$K_{10} = \frac{\tan^{-1}\frac{(R(E-B) + Q(B-H))}{(Q(I-C) + R(C-F))}}{\omega_s} \tag{24}$$

If $K_{10} \leq 0$ and numerator in (24) is $>0$;

$K_{10} = K_{10} + 180/\omega_s$ \hfill (25)

If $K_{10} > 0$ and numerator in (24) is $\leq 0$;

$K_{10} = K_{10} - 180/\omega_s$ \hfill (26)

$$K_9 = \frac{Q}{(E-B)\cos\omega_s K_{10} + (F-C)\sin\omega_s K_{10}} \tag{27}$$

$K_8 = A - K_9(B\cos\omega_s K_{10} + C\sin\omega_s K_{10})$ \hfill (28)

$K_7 = \Delta V_{E1} - 2K_8 t_1 + K_9 \omega_s \sin\omega_s(t_1 - K_{10})$ \hfill (29)

$K_6 = \Delta POS_{E4} - K_7 t_4 - K_8 t_4 - (180/\pi)(K_9 \cos\omega_s(t_4 - K_{10}))$ \hfill (30)

With the initial values of the K constants determined, an iteration cycle is started to insure that both velocity and position calculated error data agree with aircraft recorded error data. This is done by constructing an artificial point midway through the flight and iterating the calculations of velocity errors in eq. (3) and (4) until the beginning and end of flight position errors correspond with those observed from the aircraft.

Mathematically represented:

$$\Delta POS_{N1\,ASSUMED} = K_1 + K_2 t_1 + K_3 t_1^2 - \frac{180}{\pi} K_4 \cos\omega_s(t_1 - K_5) \tag{31}$$

$$\Delta POS_{E1\,ASSUMED} = K_6 + K_7 t_1 + K_8 t_1^2 + \frac{180}{\pi} K_9 \cos\omega_s(t_1 - K_{10}) \tag{32}$$

$\bar{t} = (t_4 + t_1)/2$ \hfill (33)

$\overline{\Delta V_N} = K_2 + 2K_3 \bar{t} - \omega_s K_4 \sin\omega_s(\bar{t} - K_5)$ \hfill (34)

$\overline{\Delta V_E} = K_7 + 2K_8 \bar{t} - \omega_s K_9 \sin\omega_s(\bar{t} - K_{10})$ \hfill (35)

The midpoint velocities $\Delta V_N$ and $\Delta V_E$ can now be updated by adjusting their values in proportion to the disagreement in the actual position errors at the start of the flight and their assumed values from equations (31) and (32). Thus:

$$\overline{\Delta V_N} = \overline{\Delta V_N} \pm \frac{\left\{\Delta POS_{N1} - \Delta POS_{N1\,ASSUMED}\right\}}{(t_4 - t_1)} \tag{36}$$

$$\overline{\Delta V_E} = \overline{\Delta V_E} \pm \frac{\left\{\Delta POS_{E1} - \Delta POS_{E1\,ASSUMED}\right\}}{(t_4 - t_1)} \tag{37}$$

The $\pm$ symbol in (36) and (37) means that the components are subtracted or added depending on whether the iterative position solution is converging or diverging. Using these adjusted velocities at the midpoint of the data span as one of the four data samples from the flight, equations (5) through (30) can be reevaluated to determine a new set of K constants. The solution is considered to have converged where $$\left| \Delta POS_{N1\,ASSUMED} - \Delta POS_{N1} \right| \leq 1.0 \text{ foot} \tag{38}$$

and

-continued $$\left| \Delta POS_{E1_{ASSUMED}} - \Delta POS_{E1} \right| \leq 1.0 \text{ foot} \quad (39)$$

Otherwise, equations (31) thru (37) are recomputed and another iteration cycle through equation (5)–(30) is accomplished. FIG. 7 presents a flow diagram of this process in computer logic.

In the above equations, the pre-flight position error, the pre-flight velocity error and time of occurrence of the pre-flight data are denoted by the subscript 1 (i.e. $\Delta POS_{N1}$, $\Delta POS_{E1}$, $\Delta V_{N1}$, $\Delta V_{E1}$, $t_1$). The three post-flight sets of data are denoted by the subscripts 2, 3, and 4, respectively. In equations 5–13 and 21–23 the letters on the left are used to identify the relationships on the right, respectively.

Instead of measuring the pre-flight and post-flight position and velocity components with the INS on the ground at the known locations these parameters could be measured during flight prior to and after an engagement with the position and the velocity of the aircraft accurately determined with air-to-ground or ground-to-air radar.

The use of air-to-ground radar is preferred since all of the data would be available on the aircraft and it would not have to be picked up later from the ground radar site which would be necessary if ground-to-air radar were used. The following example will refer to the use of air-to-ground radar. During flight, before an engagement, the position and velocity components of the aircraft could be accurately determined by obtaining a radar lock-on on a known target or feature on the ground, using air-to-ground radar and compared to the INS measurements (made at the same time as the radar measurements) of the position and velocity components to determine the INS error characteristics $\Delta POS_N$, $\Delta POS_E$, $\Delta V_N$, and $\Delta V_E$. After the engagement and during the flight, air-to-ground radar could be employed by obtaining a radar lock-on on a known target or feature on the ground at three different known times t to accurately determine the position and velocity components of the aircraft for comparison with the INS measurements (made at the same time as the radar measurements) of the position and velocity components to determine $\Delta POS_N$, $\Delta POS_E$, $\Delta V_N$, and $\Delta V_E$ at three different times t. Thus three sets of INS and radar data on the position and velocity components would be obtained after the engagement (during flight) at three different times t respectively to determine $\Delta POS_N$, $\Delta POS_E$, $\Delta V_N$, and $\Delta V_E$ at the three different times to obtain along with the pre-engagement radar information, four sets of the equations (3) and (4) to solve for $K_4$, $K_5$, $K_9$, and $K_{10}$. Equations (1) and (2) would then be employed to solve for $K_1$, $K_2$, $K_3$, $K_6$, $K_7$, and $K_8$ whereby a model of the INS position and velocity errors as a function of time may be computed and used to correct the INS data during the engagement as described previously.

Correction of the non-linear position error is the most important aspect of the non-linear corrections. Correction of the non-linear velocity error is not absolutely necessary in some cases. If the non-linear velocity error is not to be corrected only equations (1) and (2) would be solved. Pre-flight or prior to air engagement (during flight) a set of INS data and ground survey or radar data on the position components would be obtained to determine $\Delta POS_N$ and $\Delta POS_E$. Post-flight or after the engagement (during flight), four sets of INS data and ground survey or radar data on the position components would be obtained at four different known times t to determine $\Delta POS_N$ and $\Delta POS_E$ at the four different times to obtain four sets of post-flight or post-engagement data which, along with the pre-flight or pre-engagement data set, would permit solution of equations (1) and (2) for the unknown coefficients. Equations (1) and (2) would then be employed to compute a model of the INS position error as a function of time which then would be used to correct the INS data during the engagement.

Once the non-linear corrections of position (and velocity) have been made, if higher positional accuracy is desired during certain inflight activities (such as air-to-air training, air-to-ground weapons delivery, low level navigation, etc.) the accuracy of the INS data for each aircraft may be further enhanced by using one or more of a variety of relative positioning update procedures. Some of these techniques are as follows:

AIR-TO-AIR

The aircraft involved in the maneuver fly in a known formation prior to and/or after that maneuver for a short period of time. Knowing where a second aircraft is in the formation relative to the lead aircraft in three orthogonal axes, the data processing system post-flight can compare this information with where the INS of the second aircraft "thought" it was (after the non-linear corrections have been made) to obtain a residual for near-linear error in three orthogonal axes. This near-linear error then is corrected out of the INS data of position of the second aircraft (after the non-linear corrections have been made) to correct its location relative to the lead aircraft. The near-linear error is corrected out of the INS data of position of the second aircraft by subtracting or adding the near-linear error from or to the INS data of position of the second aircraft depending on the mathematical sign of the near-linear error. This correction is applied throughout the engagement to improve relative positional accuracy to as close as 20 feet. This is done for each of the other aircraft relative to the lead aircraft. If more than one of these is done during a given engagement, the relative error for each aircraft (except the lead aircraft) can be modeled as a function of time and corrected out of the INS data as a time-dependent linear correction.

Air-to-air radar can also be used before, during, and/or after a particular maneuver to supply relative positioning information in three orthogonal axes between or among the aircraft involved. This method is most useful during two aircraft maneuvers but the technique can be applied to larger numbers of aircraft if sufficient radar fixes are obtained. Comparison and corrections are made to the INS data of each aircraft except the lead aircraft (after corrections for the non-linear error have been made), in the manner described above. Accuracy of relative positioning data using the method is approximately 60 to 100 feet. A combination of the air-to-air radar procedure and the procedure of using a known formation for determining relative position may be used.

AIR-TO-GROUND

For air-to-ground training, each aircraft can independently determine its position relative to the earth in three orthogonal axes by obtaining an air-to-ground radar lock-on on a convenient known local terrain feature, such as a water tower. This information is played back after flight and the radar-determined position of the aircraft relative to this terrain feature is compared with the INS determined data on the aircrafts position at that time (after the non-linear corrections, have been made) to obtain an error correction in three orthogonal axes. This error correction then is corrected out of the INS data of position (after non-linear corrections have been made) for the aircraft throughout the engagement. The error correction in three orthogonal axes is corrected out of the INS data of position by subtracting or adding the error correction in three orthogonal axes from or to the INS data of position depending on the mathematical sign of the error correction in three orthogonal axes. The radar lock-on can be done prior to and/or after a maneuver and the correction provides an accuracy of approximately 100 feet.

Normal INS position updates, such as manual overfly updates and radar-determined updates, can be used to determine position relative to the earth. These provide an accuracy of about 250 feet after post-flight processing.

Combinations of the above techniques and those described under Air-To-Air above can be used for positioning multi-aircraft air-to-ground engagements.

Correction of the INS measurements in altitude now will be described. Changes in the atmospheric pressure altitude, measured by the CADC (see Table 1), from pre-flight to post-flight are employed to correct the INS measurements in altitude. The altitude correction $\Delta Alt.$ At any time in flight can be determined as follows:

$$\Delta Alt. = (Aa - A_1) + (A_1 - A_2)(t_n - t_1)/(t_2 - t_1) \tag{40}$$

Aa is the actual altitude of the aircraft pre-flight on the ground; $A_1$ is the CADC pre-flight measurement of altitude at time $t_1$; $A_2$ is the CADC post-flight measurement of altitude at time $t_2$; and $t_n$ is time after $t_1$ at any time during flight. The altitude correction $\Delta Alt.$ post-flight is corrected out of the INS measurements of altitude made during flight. For better results, these corrections should be made. However, they are not as important as the INS position and velocity error corrections.

Referring again to FIG. 2 and TABLE 1 there will be described the instrumentation on the aircraft and their outputs. The INS and its outputs has already been described. The other instrumentation comprises a Central Air Data Computer (CADC) 61, a Fire Control Radar system 63 for controlling the radar, a Fire Control Computer 65, Head-up Display (HUD) 67, a Stores Management System (SMS) 69, a Fire Control Navigation Panel 71, and an audio system 73. The outputs of instrumentation 23, 61, 63, 65, 67, 69, and 71 are applied to the recorder 25 by way of a MUX BUSS 75. The MUX BUSS 75 is a digital communication medium that connects the different instrumentation. The Fire Control Navigation Panel 71 is in the cockpit. It can display data to the pilot and can receive data from the pilot. The audio system 73 includes the aircraft's UHF and VHF radio outputs, a missile tone, a threat warning, where applicable, and an intercom between two pilots in the aircraft. The output of the audio system 73 also is applied to the recorder 25.

Referring specifically to TABLE 1, the CADC (Central Air Data Computer) measures the pressure altitude of the aircraft, the true air speed (TAS), the MACH number, the calibrated air speed (CAS) and the angle of attack of the aircraft. The angle of attack is the angle between the body axis of the aircraft and the direction it is flying. Radar provides information on the mode it is in, the slant range, the range rate, antenna azimuth, antenna elevation, and the relative target X, Y, and Z positions. The slant range is the direct distance a target aircraft is from the tracking aircraft. Antenna azimuth and antenna elevation are azimuth and elevation measurements between the tracking and target aircraft in degrees. The relative X, Y, and Z positions are three perpendicular directional distances the target aircraft is from the lead aircraft and are calculated from the slant range, antenna azimuth and antenna elevation. These positions are in aircraft coordinates and post-flight they are translated into north, east, and down coordinates. Range rate is the rate at which two aircraft are closing or separating. The Fire Control Computer provides information on normal acceleration, height above the target, weapons release and side slip during simulated air-to-air or air-to-ground ordinance delivery. Weapon release in the time when the weapons system is placed in the simulate mode for release and the pilot initiates the release sequence. Side slip is the lateral angle between the flight path and the nose of the aircraft. The Head-up display (HUD) provides information on the aircraft's roll rate, pitch rate and yaw rate in degrees per second. The Head-up display provides information to the pilot on a display system in front of the pilot. The Stores Management System manages the inventorying and release of the various weapons of the aircraft. It provides information on the mode it is in, the delivery mode (air-to-air or air-to-ground) the weapon select (the weapon selected for release), the stores remaining and the station select (the station of the external ordnance selected for release). The data buss is another input to the MUX BUSS. It gives information on the fuel weight, fuel burn rate, the position of the throttle, and whether the landing gear is stowed or deployed.

Figure 7A:
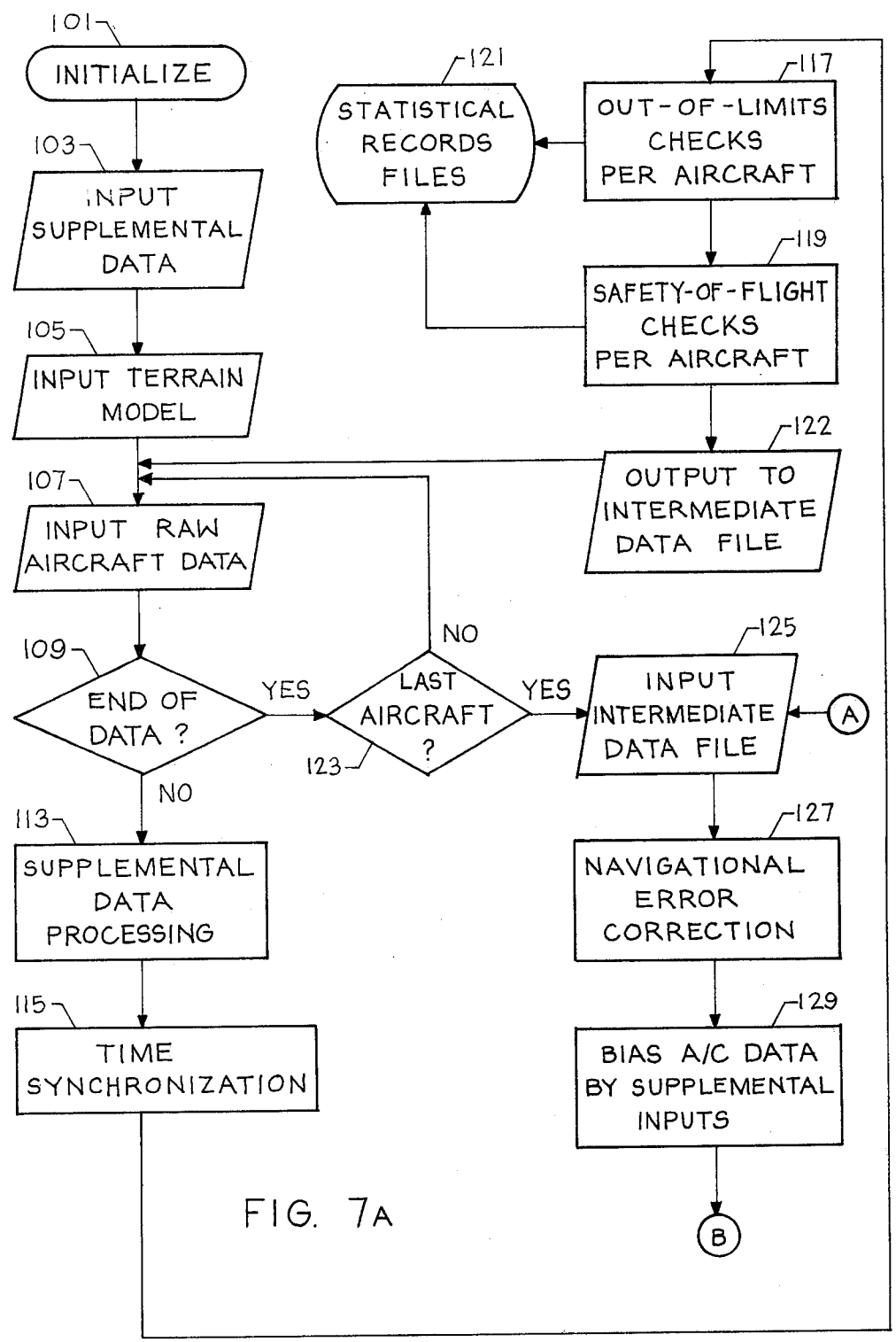
FIGS. 7A and 7B are a flow chart of a program carried out in an analytic processing computer for processing aircraft data and recording the processed data on a storage medium for use by a display processing computer system.
Figure 7B:
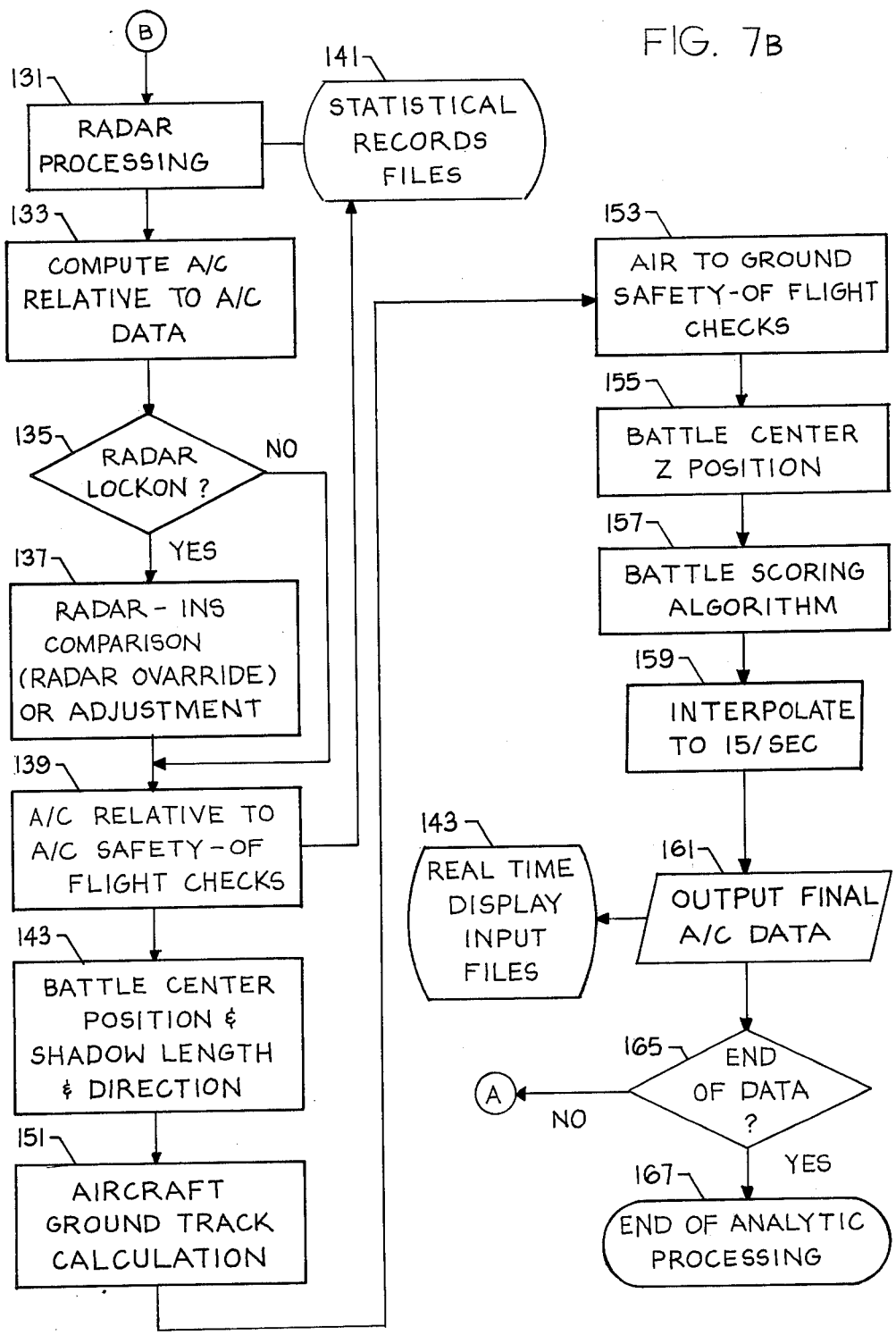

Referring now to FIGS. 7A and 7B, there will be described the flow chart of the analytic processing of the data inputted to the computer 35. In these Figures the circled letters indicate routing connections. Processing may be carried out on a PDP 11/60 or a PDP 11/45 computer which are general purpose computers manufactured by Digital Equipment Corporation. Block 101 indicates initialization of the computer—setting up the proper libraries, etc. A keyboard is provided which allows the operator to input supplementary data (block 103) such as the aircraft number, the pilots name, where the aircraft was actually located pre-flight and post-flight, and if a formation calibration was carried out in flight where each of the aircraft were relative to the lead aircraft. The terrain model is input at 105 and the raw aircraft data recorded by recorder 25, is input at 107. Blocks 107 to 122 process one aircraft's data at a time and are repeated for each aircraft. Block 109 indicates a determination as to whether the data for the aircraft has ended. Supplemental data processing is carried out at 113. The program at this point constructs a file for the supplemental data for each aircraft for use for the nagivational error corrections at 127. The data from the various aircraft are time synchronized at 115. Out of limits and safety of flights checks are made at 117 and 119 and stored at 121. Out of limits checks determine whether the aircraft is exceeding some flight manual limit. Safety of flight checks determine whether the aircraft is in an unsafe flight condition such as whether it is flying too fast, pulling too many g's, too high in altitude, etc. Block 122 indicates that the data is applied to an intermediate file. The loop then returns to pick up data from the next aircraft for processing. After it has been determined at 123 that data from the last aircraft has been processed the intermediate data file is picked up at 125 and navigational error corrections are made at 127.

At 127, the platform velocity and acceleration components of the INS are translated into north, east, and down coordinates; latitude is determined from the direction cosines; altitude corrections are made, and the INS non-linear position and velocity errors are calculated and corrected out of the INS flight data.

At 129, the corrected aircraft data for the aircraft (excluding the lead aircraft) are corrected for the residual error obtained from a formation calibration to obtain more accurate position of the other aircraft relative to the lead aircraft.

At 131 radar processing is carried out to convert radar information such as air-to-air or air-to-ground in aircraft coordinates to ground based coordinates. At 133, one plane is located relative to another using INS data. As 135 it is determined whether a radar lockon occurred (air-to-air or air-to-ground). If the answer is yes, it is determined at 137 whether the radar derived position of the aircraft is similar or different than the INS determined position of the aircraft. If the difference is significant, the INS aircraft determined position is corrected with the radar information.

Aircraft relative to aircraft safety-of-flight checks are made at 139 to make sure that the aircraft is not on a collision course with another aircraft. The data from these checks and from the radar processing are stored in statistical records files indicated at 141. The battle tower center position is properly located in the north and east direction and shadow length and direction are determined at 143. Referring to FIG. 4 the battle tower and its shadow are illustrated at 145 and 147, respectively. Arrow 149 is also computed and always points North. These are aids depicted on the ground at the center of the maneuvers that follow the aircraft as they fly. The aircraft position relative to the earth and its height above the terrain are computed at 151. Air-to-ground safety-of-flight checks are made at 153. These checks make sure that the aircraft is not flying in a path that will cause it to hit the terrain. Block 155 locates the battle tower on the ground. A numerical score is given to each aircraft at 157 for determining the advantage of each aircraft relative to the other aircraft.

The data is usually recorded at five data frames per second. In order to obtain good pictorial display quality the data is interpolated to fifteen data frames per second at 159. The final aircraft data for each aircraft is output at 161 and transferred to the real time display input file 43 (see FIG. 3) which is a storage disk. A decision is made at 165 to determine if the end of the data is reached. If not, the program loops back and picks up the next data set for all aircraft. When all of the data has been processed and stored, the program ends at 167. The data stored on the storage disk 43 which then is transferred to the display processing computer 41 for processing.

The analytic software outputs the data for each flight event to a separate area of disc storage. The following types of files are output for each event: (1) a header file containing general information, (2) a file containing display-relevant data of all aircraft, and (3) a file containing the tabular data of all of the aircraft. These files are accessed by the real-time display software.

The header file contains three types of data. It contains information which is used to identify the data on the disk. This enables the operator to determine which event is on a disk without accessing the entire disk. The header file also contains data required to initialize parameters within the real-time display software. In addition the header file contains data which was entered as supplemental data during the analytic program. Specifically the header file contains the following data as set forth in Table 2.

TABLE 2

Date of Run
Time of Run
Number of Aircraft
Number of Events
Event Number
Start Time of Event
End Time of Event
Aircraft Numbers
Aircraft Colors
Aircraft Configurations
Flight Identifications
Initial latitude and longitude of each aircraft
Final latitude and longitude of each aircraft
Number of times gun trigger used on each aircraft
Time gun trigger used
Duration of gun trigger usage
Number of supplemental data entries
Supplemental times
Supplemental X, Y, and Z Positions
Supplemental reference aircraft
Reference point longitude, latitude and altitude The gun trigger is an indication that the pilot has depressed the trigger to simulate gun firing. Table 2 contains the number of times the gun trigger is used on each aircraft, the time it was used and the duration of its use. The number of supplemental data entries refers to the number of inflight calibrations obtained. Supplemental times refers to the time of each calibration. Supplemental X, Y, and Z positions refers to the position of a second aircraft relative to the lead aircraft or the position of the aircraft relative to a ground target or feature if an air-to-ground calibration is made. Supplemental reference aircraft refers to the lead aircraft. Reference point longitude, latitude and altitude refers to the position of a ground target if an air-to-ground calibration was made.

Each aircraft display file consists of records of data which is required by the real-time display software to recreate the trajectory of the aircraft and provide the representation of the battle center. One record contains the data recorded at the beginning of a one-fifth second interval. Two interpolated values are included for each of the dynamic display parameters such as aircraft X, Y, and Z position, roll, pitch, and heading. Therefore, a data rate of fifteen data frames per second are provided. A record of the aircraft display file consists of the following data as shown in Table 3.

TABLE 3

Battle Center X Position
Battle Center Y Position
Battle Center Z Position
Battle Center Shadow X Position
Battle Center Shadow Y Position
Out-of-limits flag, impact imminent flag, safety-of-flight flag
Radar Lock-on flag
After burner on-off flag
Weapon release indicator
Gun trigger indicator
Aircraft X Position    at $t_1$, $t_1 + 1/15$, $t_1 + 2/15$

| TABLE 3-continued | |
|---|---|
| Aircraft Y Position | at $t_1, t_1 + 1/15, t_1 + 2/15$ |
| Aircraft Z Position | at $t_1, t_1 + 1/15, t_1 + 2/15$ |
| Roll | at $t_1, t_1 + 1/15, t_1 + 2/15$ |
| Pitch | at $t_1, t_1 + 1/15, t_1 + 2/15$ |
| True Heading | at $t_1, t_1 + 1/15, t_1 + 2/15$ |
| Ground Track Z position | at $t_1, t_1 + 1/15, t_1 + 2/15$ |

The out-of-limits, impact imminent flag and safety-of-flight flags are used for implementation of a blinking image to indicate safety violations. The radar lock-on flag is ued to invoke the addition of the radar antenna to the aircraft image during the radar lock-on time. The afterburner to the aircraft image during the afterburner stage. The weapon release indicator and the gun trigger indicator are used when simulating missile and gun firing events. The ground track Z position is the vertical projection of the aircraft on to the ground. In FIG. 4, the X's under the aircraft indicate the positions of the aircraft as projected on the ground.

The aircraft tabular file contains records of data used by the rea-time display software for the graphic-synchronized tabular display. The following information in Table 4 is included in each aircraft tabular file.

TABLE 4

Time
Time From Start of Event
Event Number
Altitude
Mach
Normal Load Factor
Rate of Climb
Angle of Attack
Sideslip
Height above Ground
Calibrated Airspeed
Battle Score
Roll Rate
Slant Range
Range Rate
Pointing Angle
Aspect Angle
Radar Override
Weapon Release
Gun Trigger
Radar Mode
Radar Lock-on
SMS Mode
Station Selected
Delivery Mode
Safety-of-flight
Out-of-Limits
Selected Weapon
Impact Imminent Flag
Time until Impact
X Velocity
Y Velocity
Z Velocity
Latitude
Longitude
Heading
Pitch
Roll
Pressure Altitude
True Airspeed
Height Above Target
Yaw Rate
Pitch Rate
Weapon Quantity
Rounds Remaining
Fuel Flow
Fuel State
Throttle on-off Flag
Gear Up
X Acceleration
Y Acceleration TABLE 4-continued Z Acceleration In Table 4, time is the time from the INS turn on. The time from start of event refers to the time from the start of a given inflight event. The normal load factor refers to the number of g's at which the aircraft is maneuvering. The pointing angle is the angle between the nose of a given aircraft and a line drawn from the aircraft to a target aircraft. The aspect angle is the angle between the other aircraft's nose and the line drawn from the other aircraft to the given aircraft. Radar override refers to whether radar information is used to obtain the relative position between two aircraft. Impact imminent flag determines whether an aircraft is about to hit an object such as the ground. Time until impact refers to the computed time from where an aircraft is until it hits the ground. Weapon quantity is the number of weapons on board. Fuel flow is the rate at which the fuel is burned; fuel state is the amount of fuel left on board; and throttle on-off flag indicates whether the afterburner is on or off.

As indicated above, for display processing the data storage disk 43 is transferred to the display processing computer 41 which may be a general purpose computer such as a PDP 11/34 computer, made by Digital Equipment Corporation, interfaced with a Picture System II display system of the Evans and Sutherland Computer Corporation of Salt Lake City, Utah. In one embodiment, the Evans and Sutherlens (E&S) display system comprises a computer system having its own software sub-routines and which is tied to a color TV screen for displaying the pictorial scene 51 and also tied to black and white TV screen 53 for displaying the alphanumeric data. A software program for the PDP 11/34 computer has been written to interface with the Evans and Sutherland software sub-routines.

Figure 8A:
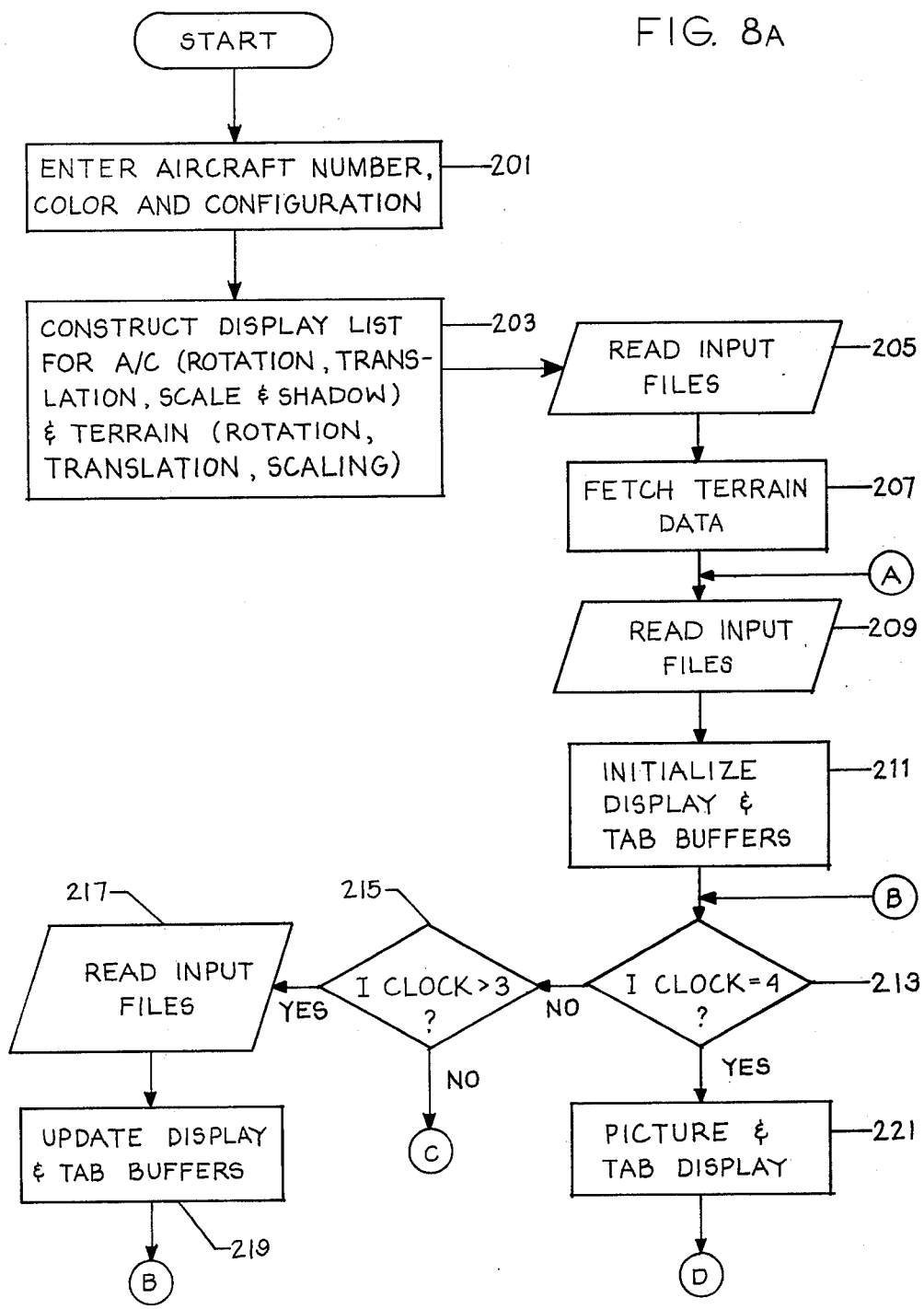
FIGS. 8A, 8B, and 8C are a flow chart of a program carried out in the display processing computer system which takes data from the storage medium and produces displays of the aircraft after a training mission in pictorial, alphanumeric or other form.
Figure 8B:
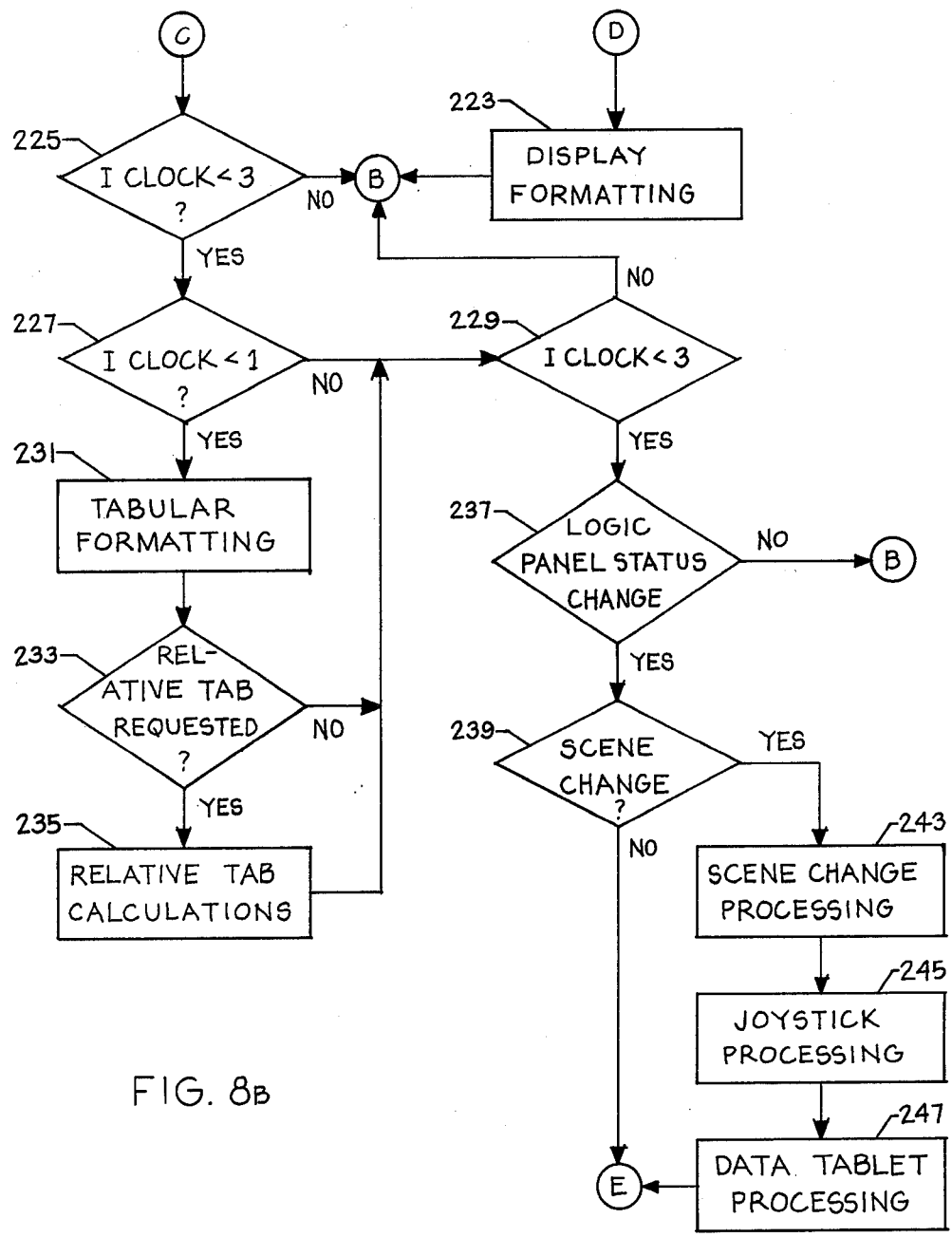
Figure 8C:
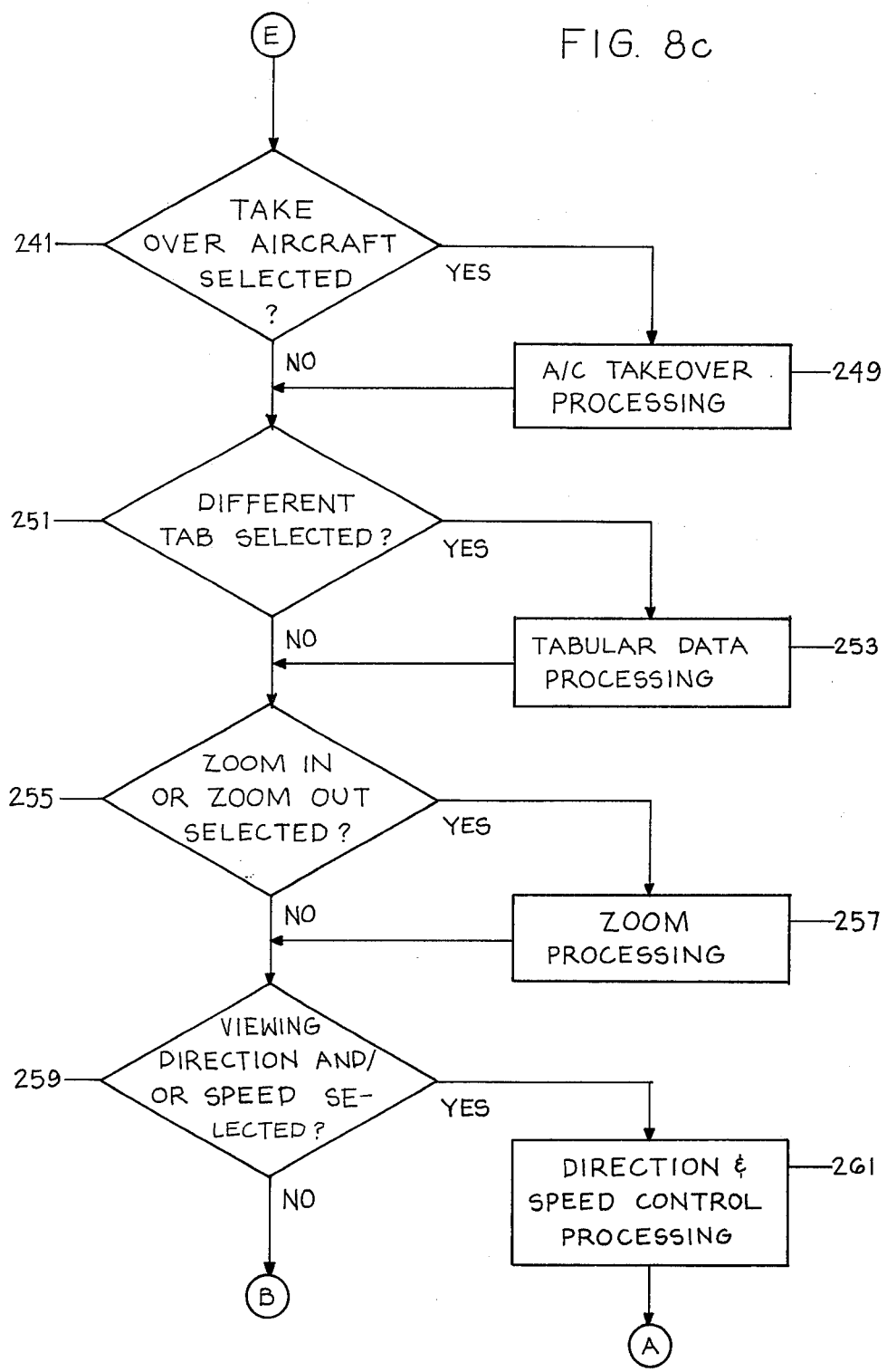

FIGS. 8A, 8B, and 8C are a real-time flow chart of a program for operating the computer system 41 to take data from the storage disks 43 and produce real-time displays of the aircraft during a training mission in pictorial or alphanumeric form. The program also interfaces with interactive control devices comprising a logic key panel, a joy stick, and a data tablet which are optional hardware available with the Evans and Sutherland display system. These devices permit the operator to control what the user wishes to see. They allow viewing of the battle scene and tabular data on separate screens. Both screens are interfaced to the same set of interactive devices.

The logic key panel enables the operator to control six view speeds of the battle scene and stop action. The six speeds are fast forward, slow forward, normal forward, fast reverse, slow reverse, and normal reverse. It enables the operator to display the overall scene as seen from the cockpits of the aircraft. The logic key panel enables the operator to display in alphanumeric form general information, relative aircraft to aircraft information, safety of flight information or weapon status information. The logic key panel also enables the operator to zoom in or out of the battle scene and to halt the zooming action when desired.

The joy stick, in conjunction with the logic key panel, enables the operator to move the battle scene around in azimuth and in elevation; to move the pilots viewpoint around the cockpit in azimuth and in elevation; and refly the aircraft on independent simulated maneuvers which are different from those done in the actual flight maneuvers.

The data tablet allows the operator to move the viewpoint of the battle scene to the left or right or up or down. The data tablet, in conjunction with the joystick, can be used to input engine throttle settings as part of a simulation to change aircraft speed.

The flow chart of FIGS. 8A, 8B, and 8C now will be described. In these Figures, the circled letters indicate routing connections. Each aircraft's number, color, and configuration are entered at 201. Based on this information, the software constructs a display list for each aircraft and for the terrain at 203. The display list includes information on each aircraft's orientation (rotation), its position in latitude, longitude, and altitude (translation), its scale and its shadow on the ground. The display list also includes information on each aircraft's orientation relative to the terrain, its position relative to the terrain and its scale relative to the terrain. The input files are read at 205, and the terrain data entered at 207. The input files are read again at 209. The data from the aircraft is read and stored in display and tab buffers 211. Real-time processing then begins.

The display computer system includes a clock which counts at 60 times per second. The visual and tabular data for viewing are updated 15 times per second and the system refreshes what's on the two screens every fifth clock count. The software monitors the clock. The most important priority is to update the visual scene. If there is still time before the system refreshes the screens, the tabular file information is processed or updated and then the interactive devices are checked. In the process, if the clock count is not equal to 4 as determined by block 213 and is greater than three as determined by block 215, the input files are read at 217 to pick up the next set or frame of aircraft information and the display and tab buffers are updated at 219. The program then returns to B. When the clock count equals to 4, the picture and tab display 221 takes the data and passes it to the display formatting routine 223 which then displays the data in pictorial and tabular form on the two screens. The program then returns to B. If the clock count is not greater than 3, as determined by block 215, a determination is made at 225 whether it is less than 3. If the clock count is not less than 3 the program returns to B. If the clock count is less than 3, a determination is made at 227 if it is less than 1. If the clock count is not less than 3, as determined at 229, the program returns to B. If the clock count is less than 1, the tabular files are updated or formatted at 231. A determination is made at 233 whether relative tab is requested. If not, the program returns to block 229. If relative tab has been requested, calculations are made at 235 and the program returns to block 229. If block 229 determines that the clock count is less than 3, a determination is made at 237 whether the logic panel status has changed. If not, the program returns to B. If it has changed, a determination is made at 239 whether a scene change has been made by the logic panel. If not, the program goes to block 241. If a scene change has been made, scene change processing is made at 243. A scene change can also be made by the joy stick and the data tablet. Thus joy stick processing and data tablet processing are carried out at 245 and 247, respectively, if necessary. Block 241 determines whether the joy stick has been used to simulate aircraft maneuvers. If the answer is yes, aircraft takeover processing is carried out at 249. If the answer is no, a determination is made at 251 whether a different tab has been selected. Either general data tab, relative data tab, weapons status data tab, or safety flight data tab can be selected. If the answer is yes, tabular data is processed at 253. A determination is made at 255 whether zoom in or zoom out has been selected. If the answer is yes, zoom processing is carried out at 257. Finally a determination is made at 259 whether different viewing direction and/or speeds have been selected. If not the program returns to B. If the answer is yes, appropriate processing is made at 261. The program then returns to A to pick up the next data frame. The program is cycled through 15 times per second.

The real time display program comprises an executive program, a number of sub-routines available with the Evans and Sutherland display system and other sub-routines used to call up the analytic data stored on the disk, to display the data in pictorial and tabular form and to interface with the interactive devices to allow the operator during playback of the recorded information to interact with the system to select different types of scenes, different viewing speeds, select which one of the several tabular displays he wants to look at, zoom in or away from the scene, etc.

The Evans and Sutherland sub-routines which are used with the real-time display program are listed in Table 5 below. These sub-routines are available with the Evans and Sutherland display system when purchased.

TABLE 5

| | |
|---|---|
| PSINIT | Initialize picture system |
| WINDOW | 2D or 3D window matrix |
| VWPORT | Set screen viewport |
| TABLET | Initialize data tablet |
| CURSOR | Initialize data tablet cursor operation |
| MAKEOB | Construct display list |
| STOPOB | Stop display list construction |
| DRAWOB | Draw display list |
| PUSH | Save transformation on stack |
| POP | Recover transformation from stack |
| INST | Instance a master object |
| NUFRAM | Initiate picture update |
| BLINK | Set blink mode |
| SWITCH | Check switch status |
| LIGHTS | Set switch lights accordingly |
| ROT | Display list rotation matrix |
| TRAN | Display list translation matrix |
| SCALE | Display list scale matrix |
| GETROT | Update display list rotation matrix |
| GETTRN | Update display list translation matrix |
| GETSCL | Update display list scale matrix |
| MASTER | Create a Master View of an Object |
| DRAW3D | Draw Array in 3D |
| MOVETO | Position to 2D or 3D Absolute Coordinates |
| TEXT | Display Text String Specified |
| COLOR | Specify Color of Subsequent Lines |
| DRAW2D | Draw Array in 2D |
| CHARSZ | Set Text Character Size |
| ANALOG | Reads Interactive Inputs |
| SETROT | Update Display List Rotation Matrix in the E&S Computer |
| SETSCL | Update Display List Scale Matrix in the E&S Computer |
| SETTRN | Update Display Translation Matrix in the E&S Computer |

The Evans and Sutherland subroutine are called by the blocks of FIGS. 8A–8C as follows: PSINIT, WINDOW, VWPORT, TABLET, CURSOR, MAKEOB, STOPOB, PUSH, POP, INST, ROT, TRAN, SCALE, MASTER, DRAW3D, MOVETO, TEXT, COLOR, DRAW2D and CHARSZ are called by block 203. DRAWOB, NUFRAM, AND BLINK are called by block 221. SWITCH AND LIGHTS are called by block 237. GETROT, GETTRN, GETSCL, SETROT, SETSCL, and SETTRN are called by block 223. ANALOG are called by blocks 239 and 241.

PSINIT initilizes all of the parameters of the picture system to zero. WINDOW selects that portion of the data the operator wants to view on the screen. VWPORT allows the operator to break the screen into different viewing sections. TABLET initilizes the data tablet parameters to zero. CURSOR allows the operator to select the data tablet to be on or off on the screen. When on, the cursor represents the pens placement on the tablet. MAKEOB initilizes a display list in the computer memory until STOPOB is called which terminates the display list. DRAWOB draws on the screen that which was in the display list created by MAKEOB. PUSH controls a matrix in memory that contains values that the picture system uses to display the picture. POP retrieves for use by the picture system the transformation from the stack in memory. INST sets up the limits of a picture for an object created by the operator. There are two buffers in the picture memory. When NUFRAM is called, the system switches from displaying the contents of the first buffer to display the contents of the second buffer and vice versa after the first buffer is updated. BLINK makes an object blink on the screen. LIGHTS lights up the switch which is "on" on the logic panel. A matrix in memory contains rotational parameters. When the operator wants to rotate an object on the screen, ROT is called. ROT sets up the parameters for the transformation that does the rotation. A matrix in memory contains translational parameters. When the operator wants to translate an object on the screen, TRAN is called. TRAN sets up the parameters for the transformation that does the translation. SCALE sets up a matrix for scaling. It is used for zoom in or out. GETROT updates the rotational matrix in the PDP memory. GETTRN updates the translation matrix in the PDP memory. GETSCL updates the scale memory in the PDP memory. MASTER creates the master object in memory. INST allows the operator to draw one or more of the master objects on the screen. DRAW3D sets an array of points in three dimensions in memory. MOVETO provides information as to the location that the beam of the cathode ray tube is to be moved. TEXT is used for tabular display. It sets up the text to be displayed on the screen. COLOR sets the color of the object. DRAW2D sets any array of points in two dimensions in memory. CHARSZ sets the size of the text. ANALOG sets values for the joystick. As the joystick moves, ANALOG is called to obtain an update of the joystick. SETROT, SETSCL, and SETTRN perform the same functions as GETROT, GETSCL and GETTRN, respectively, except in this case, the display lists are stored in E&S memory as opposed to the PDP memory. E&S memory is larger than that of the PDP and is used for large programs.

Figure 9:
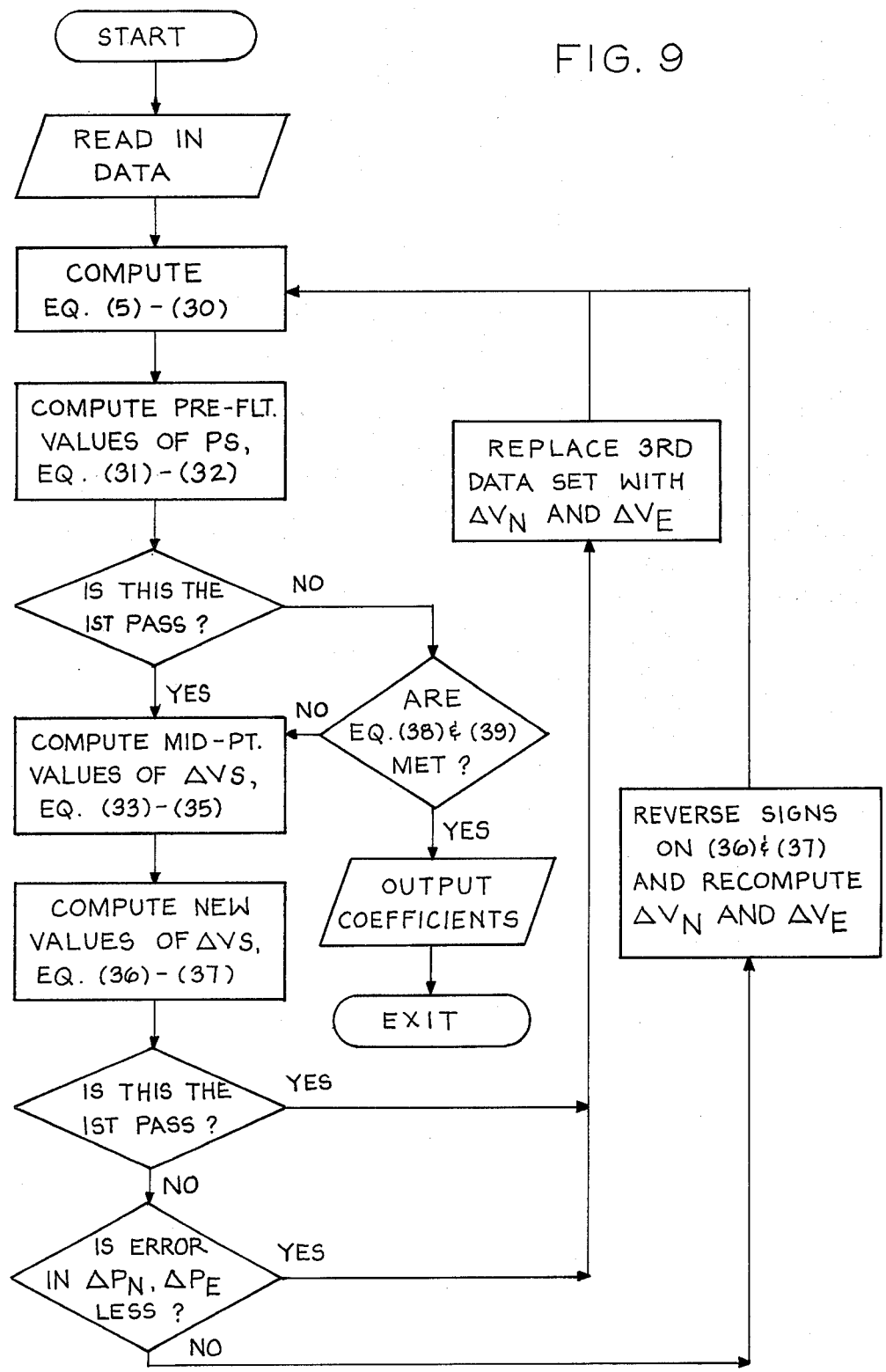
FIG. 9 is a flow chart of the navigational error correction subroutine of block 127 of FIG. 7A.

A more detailed discussion is presented in Appendix A of the subroutines of the analytic program which correspond with blocks 103, 113, 115, 117, 119, 129, 133, 139, 143, 151, 153, 157, and 159 of the flow chart of FIGS. 7A and 7B. These subroutines are listed in TABLE 6 below. Equations 5–39 discussed above, fully set out the calculations carried out by the subroutine of block 127 of FIG. 7A. FIG. 9 is a flow chart of the navigational error correction subroutine of block 127 of FIG. 7A.

In Appendix A, the subroutines listed in TABLE 6 below are discussed. In TABLE 6, the subroutines on the left correspond with the blocks of FIGS. 7A and 7B identified on the right.

TABLE 6

| Subroutines | Blocks of FIGS. 7A and 7B |
| --- | --- |
| SUPDAT | 103 |
| SUPPRO | 113 |
| TIMSYN | 115 |
| BIATIM | 115 |
| OUTLAC | 117 |
| SOFPAC | 119 |
| BACSUP | 129 |
| COMREL | 133 |
| ARASOF | 139 |
| BCPSLD | 143 |
| ACGTCL | 151 |
| ATGSOF | 153 |
| BATLSC | 157 |
| INTRP | 159 |

Given the information set forth in this application, one skilled in the art, without undue experimentation, can write a fortran listing of the analytic program of FIGS. 7A and 7B and of the real-time display program of FIGS. 8A, 8B, and 8C.

APPENDIX A

Supplemental Data Input (SUPDAT)

INPUT: None

PROCESSING: The supplemental data input routine (SUPDAT) shall be an "operation-oriented" interface between the operator and the analytic software. The operator shall be capable of entering three classes of data (1) data required for initialization of the analytic software, (2) data required for the simulation of actual aircraft data not currently supplied by the on-board recorder, and (3) data required for aircraft-to-aircraft positioning corrections.

All operator responses to SUPDAT data prompts shall be recorded in tables and constant variables which shall be available for all routines which require any supplemental data. Proper response formats or types (integer or real) are given with each prompt. If an incorrect response is input, the prompt shall be reissued. In some cases, a table format shall be given on the screen and the operator simply fills in the table entries.

To initialize the analytic software, the SUPDAT routine prompts the operator for the following parameters:
    Date of run
    Time of run
    Number of aircraft being processed
    Reference coordinates for the display output
        Latitude
        Longitude
        Altitude
    Per aircraft
        Flight identification
        Aircraft tail number
        Color
        Configuration (F-16, F-4, etc.)
These items also shall be used for report purposes and initialization parameters to be passed to the display.
    Initial latitude
    Initial longitude Final latitude
Final longitude The following data shall be entered to supplement the in-flight data not currently recorded on the aircraft.
  Number of events in scenario
  Per aircraft
  Start and end time of each event
  Number of times gun trigger used
  Gun trigger duration for each usage
  Time when gun trigger usage occurred The times of each event mark for each aircraft shall be entered in the following order: Start event 1, end event 1, start event 2 etc. Both the event mark start and end times and the guntrigger usage time are converted from HHMMSS.SSS format to elapsed time in seconds from ØØØØØØ.ØØØ hours. The gun trigger usage interval end time shall be calculated from the start time and duration. Once this information is supplied by the on-board system, this function of the operator interface shall be deleted.

Finally, if supplemental data for aircraft-to-aircraft positioning is available the operator shall be capable of entering the following data:
  Number of supplemental data points
  Data point time
  X position offset
  Y position offset
  Z position offset
  Aircraft numbers associated with data points The data point time also shall be converted from HHMMSS.SSS format to total elapsed time (in seconds) from ØØØØØØ.ØØØ hours. The supplemental data positions entered shall be used to bias the position of the indicated aircraft relative to a designated reference aircraft (aircraft number one).

OUTPUT: The following parameters are output by the SUPDAT routine:
  Variables:
    Number of aircraft being processed
    Number of event in scenario
    Number of supplemental data points
    Date of run
    Time of run
    Reference display latitude
    Reference display longitude
    Reference display altitude
  Arrays
  Containing:
    Aircraft flight identifications
    Aircraft tail numbers
    Aircraft colors
    Aircraft configurations
    Initial latitude of each aircraft
    Initial longitude of each aircraft
    Final latitude of each aircraft
    Final longitude of each aircraft
    Start and end times of each event for each aircraft
    Number of times gun trigger used on each aircraft
    Time of each gun trigger usage on each aircraft
    Duration of each gun trigger usage on each aircraft
    End of each gun trigger interval on each aircraft
    Time of each supplemental data point
    X position offset
    Y position offset
    Z position offset
    Aircraft numbers associated with data points

Supplemental Data Processing (SUPPRO)

INPUT: SUPPRO shall require the number of the buffer containing the current data frame. Also SUPPRO shall require access to the following arrays generated by SUPDAT.
  The number of gun trigger usages for each aircraft
  The times of each gun trigger interval for each aircraft
  The end of each gun trigger interval for each aircraft PROCESSING: SUPPRO shall be invoked during pass one of the analytic program. The function of the SUPPRO routine consists of generating the guntrigger flag to be appended to the data frame being processed. As each time tag is evaluated, the guntrigger flag is returned as set if the time tag is within a guntrigger usage interval which was input for that aircraft during the supplemental data routine SUPDAT. If the time tag is not within a guntrigger interval, the flag is returned as clear for the array. A guntrigger usage interval shall be identified by the time of the guntrigger usage and the end of the guntrigger interval. This routine shall only be used in the initial implementation. The actual aircraft recorder data shall include the guntrigger flag.

OUTPUT: For each data frame processed, a guntrigger flag shall be returned by SUPPRO.

TIME SYNCHRONIZATION (TIMSYN)

INPUT: The following shall be required by the time synchronization routine (TIMSYN). To distinguish between the reference and non-reference aircraft, the aircraft number shall be required. A buffer number shall be used to indicate which buffer contains the data for the current data frame being evaluated. As each buffer containing one data frame from the current aircraft file is processed, its time tag shall be accessed by the TIMSYN routine. Also, TIMSYN shall require access to the array containing the start and end event mark times for each aircraft compiled by the supplemental data routine SUPDAT.

PROCESSING: Time synchronization shall be performed in pass one of the analytic program. The aircraft designated as aircraft one shall be used as the reference aircraft. As each non-reference aircraft file is processed, the file shall be time synchronized to the reference aircraft file by adjusting its time tags. Using the array containing the start and end event mark times for each aircraft, the difference between the time of each event for the reference aircraft and the time of the corresponding event for the non-reference aircraft shall be calculated and recorded in an array. If the time tag of the buffer is within an event interval for the aircraft, it shall be modified by adding the appropriate difference calculated above to the time tag. Therefore, the time of each event shall be the same for each aircraft when pass one has been completed.

For the reference aircraft, a biasing factor for each event shall be calculated by taking the difference between the start time of an event mark and the time tag of the first complete data array after the event mark. A similar offset factor shall be calculated for each event of the non-reference aircraft. The arrays containing the time difference between the reference aircraft and the non-reference aircrafts and the biasing and offset factors shall be accessed later in BIA-TIM which aligns the data arrays among the aircraft files.

If the time tag of the buffer being evaluated is within an event interval, the appropriate event number shall be returned for the array. Arrays not within an event interval shall not be copied back to the aircraft file. In later implementations, the event marks shall already be entered in the aircraft files by the aircraft recorder. Therefore, as each array of the reference aircraft file is accessed the event mark entry shall be checked. The time tag of the first data frame in every event shall be recorded in an array as reference event times. This array shall be used like the event time array described earlier. The time synchronization of the reference aircraft and all other aircraft shall be the same as in the initial implementation. The only different shall be that the times of the event marks must be determined.

OUTPUT: The TIMSYN routine shall return the following information into the buffer currently being evaluated:
  A modified time tag
  *Event number
*Indicates Parameter not used in later implementations.
Also, the following arrays are generated which contain:
  The time difference between corresponding event marks of the reference and each non-reference aircraft
  The time bias between each start even time and the first complete data frame for the reference aircraft.
  The time offset between each start event time and the first complete data frame for each non-reference aircraft.
  The event mark start and end times for the reference aircraft.

Time Bias (BIATIM)

INPUT: The number of the buffer which contains the data frame currently being evaluated and the aircraft number shall be required by the time biasing routine (BIATIM). BIATIM requires access to the following parameters from three consecutive buffers containing the data frames for times t, t+1, and t+2:
For aircraft being processed
  CXX, CXY, and CXZ at time t
  X, Y, and Z velocities at time t
  Longitude at times t and t+1
  INS altitude at times t and t+1
  Pitch at times t, t+1, and t+2
  Roll at times t, t+1, and t+2
  Pressure altitude at time t
    Event number for time t
    Time tag t
  Yaw at times t, t+1, and t+2
Other input which shall be required includes:
  Initial INS altitude of reference aircraft
  Reference display longitude
  Reference display latitude
  Array of offset factors for each event of reference aircraft
  Array of biasing factors for each event of each non-reference aircraft
PROCESSING: The function of BIATIM consists of aligning the data frames of the non-reference aircraft being processed with the data frames of the reference aircraft for each event. Corresponding data arrays of these two aircraft may not have the same time tag because the difference between the start time of an event and the time of the first data frame for the reference aircraft may not be the same difference for the aircraft being processed.

Only the following variables for the non-reference aircraft shall require biasing: longitude, latitude, INS altitude, pitch, roll, and yaw. To bias the time tag, the difference of the reference biasing factor and the non-reference aircraft offset factor must be added to the time tag. The biasing of these variables shall be critical for the display. Since the remaining array variables shall be updated and displayed at the rate of one per second, the small time lag in values for these variables shall not be as critical.

Other functions performed by BIATIM for both reference and non-reference aircraft include: (1) calculating latitude from the INS values CXX, CXY, and CXZ, (2) converting latitude, longitude, and altitude to aircraft X, Y and Z coordinates, and (3) calculating North, East, and down velocities.

The following equations convert INS values for CXX, CXY, and CXZ into aircraft latitude:

$$\alpha = \arctan\left(\frac{-CXY}{CXX}\right)$$

If CXX is less than zero, add $\pi$ radians or 180 degrees.

$$\text{Latitude} = \arctan\left(\frac{CXZ}{CXX * \cos\alpha - CXY * \sin\alpha}\right)$$

To calculate North, East and down velocities, the following equations shall be used:

North velocity = X velocity * cos $\alpha$ − y velocity * sin $\alpha$
East velocity = X velocity * sin $\alpha$ − y velocity * cos $\alpha$
down velocity = −Z velocity To bias the aircraft longitude, latitude and INS altitude, the following equations shall be used:
  First calculate the difference ($\Delta$) between the reference aircraft biasing factor and the non-reference offset factor. If this difference is zero, the data frames are already aligned and time biasing shall not be required. Both values for time t and t+1 for these parameters shall be used longitude (biased) = longitude$_t$ + $\Delta$*(longitude$_{t+1}$ − longitude$_t$)

latitude (biased) = latitude$_t$ + $\Delta$*(latitude$_{t+1}$ − latitude$_t$)

INS altitude (biased) = INS altitude$_t$ + $\Delta$*(INS altitude$_{t+1}$ − INS altitude$_t$)

The following equations calculate the biased value for pitch. Similar equations shall be used for roll and yaw. Values at times t, t+1, and t+2 shall be used.

$k_1 = 5*[(\text{pitch}_{t+2} - \text{pitch}_t)/0.4 - (\text{pitch}_{t+1} - \text{pitch}_t)/0.2]$ $k_2 = [\text{pitch}_{t+1} - \text{pitch}_t - k_1*((\Delta t+1)^2 - (\Delta t)^2)]/0.2$ $$\text{pitch}_{\text{biased}} = \text{pitch}_t + k_2 * \Delta + k_1 * ((\Delta t + 1)^2 - (\Delta t + 2)^2)$$

$\Delta t$ is the difference between the time tag t and the start event time for the current event $\Delta t + 1$ is the difference between the time tag $t+1$ and the start event time for the current event.

Finally the equations to calculate the aircraft x, y, and z coordinates in feet using latitude, longitude and altitude are conversion factor = 365463.57 x = cos ((latitude + reference display latitude)/2)* (longitude − reference display longitude)* conversion factor y = (latitude − reference display latitude)* conversion factor z = INS altitude − initial INS reference aircraft altitude OUTPUT: The following biased parameters shall be returned by BIATIM:
Time Tag
Roll
Pitch
Yaw
INS altitude
longitude
latitude
Other parameters which shall be output include:
 X, Y, and Z aircraft positions
 North, East, and down velocities

OUT-OF-LIMITS PER AIRCRAFT (OUTLAC)

INPUT: The out-of-limits per aircraft routine (OUTLAC) shall require the number of the buffer which contains the data for the current data frame being processed. By using the buffer number, OUTLAC shall access the following parameters:
 Pressure altitude
 Normal acceleration
 Sideslip
 Radar Mode Word
 SMS Mode Word
 Roll Rate
 Fuel Weight PROCESSING: OUTLAC routine shall be invoked in pass one of the analytic program. After the data has been time synchronized and biased, the above parameters shall be checked for values which are out-of-limits. The range specifications for an out-of-limit condition for each of the parameters is given below.
 Pressure altitude > 50000
 Normal acceleration < −4.0
 Normal acceleration > 9.0
 Sideslip > 10.0 or
 Sideslip < −10.0
 Radar mode ≦ 2
 SMS mode word > 0
 Roll rate > 40
 Fuel weight < 1000

The radar function shall be obtained from bits 1–4 of the Radar Mode Word, and master arm switch shall be obtained from bit 4 of the SMS Mode Word. If any parameter is out-of-limits, an indicator word (bit pattern) shall be built to indicate which parameter was out-of-limits. Statistical information such as the number of times and the amount of time each parameter for the aircraft was out-of-limits shall be recorded. Also, more general information such as the number of times and the amount of time any of the above parameters for the aircraft was out-of-limits shall be recorded.

OUTPUT: The following parameters shall be provided as output to the statistical records file:
Number of times out-of-limits and amount of time out-of-limits for:
 Pressure Altitude
 Normal Acceleration
 Sideslip
 Radar Function (Radar Mode Word)
 Master Arm (SMS Mode Word)
 Roll Rate
 Fuel Weight
 All Parameters (Total)

An out-of-limits indicator word shall be output for the statistical records file, aircraft display and tabular files for the appropriate aircraft.

Safety-of-Flight Per Aircraft (SOFPAC)

INPUT: The number of the buffer which contains the data frame being currently processed shall be required by the safety-of-flight per aircraft routine (SOFPAC). By using the buffer number, SOFPAC shall be able to access the following parameters:
 Calibrated airspeed
 Angle of attack
 Pressure altitude
 Mach PROCESSING: Safety-of-flight per aircraft checks are performed in pass one of the analytic software. The SOFPAC routine shall evaluate the above parameters for per aircraft safety range violations. The range violations for each parameter are defined below:
 Calibrated airspeed < 100 or
 Calibrated airspeed > 600
 Angle of attack > 18° (alert condition) or
 Angle of attack > 25° (warning condition)
If Mach > 2.2
OR
If 20000 ≦ pressure altitude < 32500 then
 $F1 = k_1 + k_2$ *pressure altitude where
  $k_1 = -0.36$ and $k_2 = 0.000018$
 and if F1 > Mach
OR
if 32500 ≦ pressure altitude < 34100 then
 $F2 = k_3 + k_4$ *pressure altitude where
  $k_3 = -6.68125$ and $k_4 = 0.0002125$
 and, if F2 > Mach
OR
If 34100 ≦ pressure altitude > 45000 then
 $F3 = k_5 + k_6$ *pressure altitude where
  $k_5 = 0.42422$ and $k_6 = 0.00000413$
 and if F3 > Mach
OR
If 45000 ≦ pressure altitude < 55000 then
 $F4 = k_7 + k_8$ *pressure altitude where
  $k_7 = -0.7626$ and $k_8 - 0.0000305$
 and if F4 > Mach
OR
 $F5 = k_9 + k_{10}$ * pressure altitude > Mach (below 20000 feet altitude)

A per aircraft safety-of-flight flag and parameter indicator (bit pattern) shall be built to indicate which parameters and safety conditions were violated. Separate totals shall be maintained for the number of times and amount of time each parameter and safety condition is exceeded. Also, a total for all per aircraft safety-of-flight violations and the amount of time when per aircraft safety-of-flight ranges were exceeded shall be maintained.

OUTPUT: The SOFPAC routine shall provide the following parameters for output:
  For display, tabular, & statistical records files:
    Per Aircraft safety-of-flight flag and parameter indicator
  For the statistical records files only:
    Number of times and total time
      Calibrated airspeed safety exceeded
      Angle-of-attack alert safety exceeded
      Angle-of-attack warning safety exceeded
      All parameters (total)

Bias A/C Data by Supplemental Input (BACSUP)

INPUT: BACSUP requires access to the buffer pointer table. The buffer pointer table shall be used to access the buffers containing the corresponding data frames of all the processed aircraft. The current supplemental data point array index and the time-ordered arrays for the following supplemental data entered in SUPDAT:
  Time of each supplemental data point
  X position offset
  Y position offset
  Z position offset
  Aircraft numbers associated with data points
The parameters required from each buffer for each aircraft includes:
  Time tag
  Aircraft number
  X, Y, and Z position of aircraft
  Yaw (of reference aircraft)
  Roll (of reference aircraft)
  Pitch (of reference aircraft)

PROCESSING: The function of the BACSUP routine shall consist of biasing the position data of each non-reference aircraft relative to the reference aircraft (#1) using the positioning offset data entered by the operator in the SUPDAT routine if it was input. BACSUP shall be performed in pass two of the analytic software using data from the intermediate file generated in pass one.

The buffers shall be processed one at a time until data for all aircraft have been processed. The time tag and circuit # passed from the buffer shall be compared to the time and aircraft # entry pairs in the supplemental arrays. If supplemental data (X, Y, and Z position offsets) have been entered for the aircraft being processed, these supplemental values shall be converted from relative aircraft body coordinates to relative ground coordinates. The conversion equations are given below.

| | |
|---|---|
| X offset con- verted | = X position offset * cos (pitch) * sin (yaw) + Y position offset * [sin(roll) * sin(pitch) * sin(yaw) + cos (roll) * cos(yaw)] + Z position offset * [sin(yaw) * sin(pitch) * cos(roll) − cos(yaw) * sin (roll)] |
| Y offset con- verted | = X position offset * cos(pitch) * cos(yaw) + Y position offset * [cos(yaw) * sin(pitch) * sin(roll) − sin(yaw) * cos(roll)] + Z position offset * [cos(yaw) * sin(pitch) * cos(roll) + sin(yaw) * sin(roll)] (BACSUP) |
| Z offset con- verted | = −[X position offset * sin (−pitch) + Y Position offset * cos(pitch) * sin(roll) + Z position offset * cos(pitch) * cos(roll)] |

The biased X, Y, and Z positions for the aircraft shall be calculated by adding the X, Y, and Z offsets converted above to the recorded X, Y, and Z positions accessed from the buffer. Also biasing factors for X, Y, and Z components for the aircraft shall be calculated by determining the difference between the new biased position and the recorded position of the aircraft. The biasing factors shall be used to bias the recorded aircraft position in each data frame until another supplemental data entry is processed for that aircraft.

OUTPUT: The output of the BACSUP routine shall be biased X, Y, and Z position data for the aircraft array being processed.

Compute A/C Relative to A/C Data (COMREL)

INPUT: COMREL shall require access to the buffer pointer table. Other parameter which be required shall be
  Number of aircraft being processed
  Arrays for each aircraft containing:
    Aircraft colors (entered in SUPDAT)
    X, Y, and Z positions
    X, Y, and Z velocities COMREL shall be invoked in pass two of the analytic program. The COMREL routine shall compute the slant ranges and range rates for each aircraft of a friendly/enemy aircraft pair using the INS data supplied by the aircraft recorder. A friendly/enemy aircraft pair are defined as two aircraft of different colors.

The calculated slant ranges and range rates shall be used in another routine which shall identify the location of a target when there is radar lock-on. For the equations used to compute these values refer below:

$X$ range $= X_{reference} - X_{relative}$ $Y$ range $= Y_{reference} - Y_{relative}$ $Z$ range $= Z_{reference} - Z_{relative}$ $$\text{slant range}_{reference\ to\ relative} = \sqrt{X\ \text{range}^2 + Y\ \text{range}^2 + Z\ \text{range}^2}$$

If the slant range was not zero, the range rate shall be calculated as follows:

$\Delta X$ velocity $= X$ velocity$_{reference} - X$ velocity$_{relative}$ $\Delta Y$ velocity $= Y$ velocity$_{reference} - Y$ velocity$_{relative}$ $\Delta Z$ velocity $= Z$ velocity$_{reference} - Z$ velocity$_{relative}$ $\Delta$velocity $= \sqrt{\Delta X\ \text{velocity}^2 + \Delta Y\ \text{velocity}^2 + \Delta Z\ \text{velocity}^2}$ $$\text{angle} = \arccos\left[\frac{X\ \text{range} * \Delta X\ \text{velocity} + Y\ \text{range} * \Delta Y\ \text{velocity} + Z\ \text{range} * \Delta Z\ \text{velocity}}{\text{slant range}_{reference\ to\ relative} * \Delta\text{velocity}}\right]$$

$$\text{range rate}_{\text{reference to relative}} = \frac{-\cos(\text{angle})}{|\cos(\text{angle})|} * \Delta\text{velocity}$$

OUTPUT: The output from COMREL shall include the following parameters:
Slant ranges for each friendly/enemy aircraft pair
Range rates for each friendly/enemy aircraft pair A/C Relative to A/C Safety-of-Flight Checks (ARASOF)

INPUT: ARASOF shall require access to the buffer pointer table to access the following parameters from the current data frames for each aircraft:
Number of aircraft being processed
Slant ranges
Range rates PROCESSING: ARASOF shall be invoked during pass two of the analytic program. The functional relationship of the relative range rates and slant ranges shall be evaluated for each aircraft of an aircraft pair. If the safety-of-flight ranges have been exceeded, an aircraft-relative-to-aircraft safety-of-flight flag shall be set and returned. The number of times and total time aircraft-relative-to-aircraft safety-of-flight has been exceeded shall be calculated in ARASOF for the statistical records file.

OUTPUT: The following values shall be returned from ARASOF:
For the tabular, display and statistical records files:
  o Aircraft-relative-to-aircraft safety-of-flight flag for each aircraft
For the statistical records file:
  o Number of times a/c-relative-to-a/c safety-of-flight exceeded for each aircraft
  o Total time a/c-relative-to-a/c safety-of-flight exceeded for each aircraft Battle Center Position and Shadow Length and Direction (BCPSLD)

INPUT: Input parameters required by BCPSLD shall include:
Buffer pointer table
Number of aircrafts being processed
Time tag for t
Arrays for each aircraft containing:
  Interpolated X, Y, and Z positions from INTRP PROCESSING: The X and Y positions at time t of all the aircraft shall be totalled separately and each total divided by the number of aircraft to calculate the X and Y position of the battle center at time t. The same calculation shall be repeated for times t+1/15 and t+2/15. Therefore, three X and three Y positions shall be calculated.

The time tag shall then be evaluated to determine the position of the sun. If the time tag indicates that it is daylight (6:30≦t≦17:30), the time tag shall be further evaluated to determine whether it is morning (t<12:00) or afternoon (t>12:00). The battle center shadow angle, length, and y position are calculated as follows:
  $\Delta$time = $|t-12:00|$
  shadow angle = 15.0 degrees *$\Delta$time (in hours)
  shadow length = tan (shadow angle) * battle height
  shadow length y position = battle center y position + shadow length * factor
However, if t≦12:00, the factor shall be a negative one. If t>12:00 factor shall be one.

OUTPUT: The following parameter shall be generated by BCPSLD:
Arrays containing:
  X and Y battle center position for t, t+1/15, t+2/15
  X and Y battle center shadow length position for t, t+1/15, t+2/15.

Aircraft Ground Track Calculations (ACGTCL)

INPUT: ACGTCL shall require the buffer pointer table to access the following parameters for the current data frame for each aircraft.
X and Y position
Also, the terrain model must be accessible.

PROCESSING: ACGTCL shall be invoked during pass two of the analytic program. An aircraft ground track is the projection of the aircraft position onto the terrain. Each aircraft's ground track Z position shall be generated by retrieving the Z coordinate in the terrain model corresponding to the X and Y coordinates of the aircraft.

OUTPUT: The following array shall be generated by ACGTCL for each aircraft:
Aircraft ground track Z coordinate Air-to-Ground Safety-of-Flight Checks (ATGSOF)

INPUT: The following parameters shall be accessed by ATGSOF:
Number of buffer containing current data frame
Number of aircraft being processed
Present altitude
X and Y position
Calibrated airspeed
Z velocity component (rate of climb)
Gear up indicator
Terrain Model PROCESSING: ATGSOF shall be invoked in pass one of the analytic program. The ATGSOF routine shall evaluate the functional relationships of the parameters for altitude above the ground, calibrated airspeed, rate of climb, and gear up. Based on this evaluation, the routine shall set and return an air-to-ground safety-of-flight flag if certain safety ranges have been exceeded. If all of the following conditions exist air-to-ground safety-of-flight has been exceeded:
Altitude is above the ground <100 feet
and
Calibrated airspeed <150
and
Z velocity <0
and
Gear up The altitude above the ground is calculated by taking the difference between the pressure altitude of the aircraft and the ground elevation from the terrain model at the X and Y location of the aircraft. Both the number of times and total time air-to-ground safety-of-flight has been exceeded shall be maintained by ATGSOF. Values for the minimum, maximum and average altitude above the ground shall be maintained.

OUTPUT: The following parameters shall be generated by the ATGSOF routine:
For the tabular and display files arrays containing for each aircraft:
Altitude above the ground
Air-to-ground safety-of-flight flag For the statistical records file arrays containing the following on each aircraft:
- Number of times air-to-ground safety-of-flight exceeded
- Total time air-to-ground safety-of-flight exceeded
- Air-to-ground safety-of-flight flag
- Altitude above the ground minimum, maximum and average

Battle Scoring Algorithm (BATLSC)

INPUT: The BATLSC routine shall require access to the buffer pointer table in order to access the following parameters from the current data frames for each aircraft:
- Number of aircraft being processed
- Time tag at time t
- Aircraft color
- Aircraft number
- Computed slant ranges
- Event number
- X, Y, and Z velocities
- X, Y, and Z positions Also, the array of start and end times for each event shall be required as input.

PROCESSING: BATLSC shall be invoked during pass two of the analytic program. Battle scores shall be calculated for all permutations of friendly/enemy aircraft pairs. A friendly/enemy aircraft pair shall be defined as two aircrafts of different colors. Battle scores shall be recorded for display in the tubular portion of the real-time software and in the statistical records file used for paper report generation. Equations for the derivations of the battle scores are given below.

$$\text{velocity}_{ref.} = \sqrt{X \text{ velocity}_{ref.}^2 + Y \text{ velocity}_{ref.}^2 + Z \text{ velocity}_{ref.}^2}$$

pointing angle$_{ref.\ to\ rel.}$ =

$$\text{Arccos}\left[\frac{\Delta\text{range } X_{ref.\ to\ rel.} * X \text{ vel.}_{ref.} + \Delta\text{range } Y_{ref.\ to\ rel.} * Y \text{ vel.}_{ref.} + \Delta\text{range } Z_{ref.\ to\ rel.} * Z \text{ vel.}_{ref.}}{\text{computed slant range}_{ref.\ to\ rel.} * \text{velocity}_{ref.}}\right]$$

angle off$_{ref.\ to\ rel.}$ =

$$\text{Arccos}\left[\frac{\Delta\text{range } X_{ref.\ to\ rel.} * X \text{ vel.}_{rel.} + \Delta\text{range } Y_{ref.\ to\ rel.} * Y \text{ vel.}_{rel.} + \Delta\text{range } Z_{ref.\ to\ rel.} * Z \text{ vel.}_{rel.}}{\text{computed slant range}_{ref.\ to\ rel.} * \text{velocity}_{rel.}}\right]$$

pointing angle$_{rel.\ to\ ref.}$ = 180° − angle off$_{ref.\ to\ rel.}$
angle off$_{rel.\ to\ ref.}$ = 180° − pointing angle$_{ref.\ to\ rel}$
$\alpha$ = pointing angle$_{ref.\ to\ rel.}$ + angle off$_{ref.\ to\ rel}$ $$\text{combat score} = 100 * \left(\frac{\alpha}{180} - 1\right)^2$$

If $\alpha > 180°$ then the combat score shall be zero.

$$\text{battle score}_{ref.\ to\ rel} = \frac{\text{combat score}}{2} * \left[1 + \cos\left(\frac{\text{computed slant range}_{ref.\ to\ rel.}}{R_H - R_L}\right) * 180\right]$$

If the computed slant range$_{ref.\ to\ rel} < R_L$ then the battle score$_{ref.\ to\ rel}$ = combat score and
If the battle score$_{ref.\ to\ rel} < 0$ then the battle score$_{ref.\ to\ rel}$ is set to zero $R_H$ and $R_L$ are range constants.

* In later implementation when more than two aircraft are used, the amount of relative data calculated shall be numerous. Therefore, values for relative data such as the pointing angle, aspect angle, and instantaneous battle score of a friendly/enemy pair shall be calculated separately by a routine in the real-time display software instead of being passed by the analytic software.

For each aircraft, a minimum and a maximum battle score for each event are recorded. Also, the time tag and relative aircraft number associated with the minimum and maximum battle scores shall be recorded. In addition, an average score for each aircraft during each event shall be calculated. The array of start and end times of an event shall be required to calculate the event length and the elapsed time from start of event used in calculating the battle score averages. When the aircraft time tag is approximately equal to the event time the minimum, maximum, total and average battle scores shall be recorded and reinitialized for the next event.

BATLSC

OUTPUT: The following parameters shall be generated for output by the battle scoring routine to be passed to the realtime display software:
- *Pointing angle for each permutation of friendly-/enemy aircraft pairs
- *Aspect angle for each permutation of friendly-/enemy aircraft pairs.
- *Instantaneous battle score for each permutation of friendly/enemy pairs.

In addition, the following parameters shall be computed for the statistical records file:
- Instantaneous battle score (described above)
- Maximum battle score for each aircraft during each event.
- Minimum battle score for each aircraft during each event.
- Average battle score for each aircraft during each event.
- Time of maximum battle score and relative aircraft number for each aircraft.
- Time of minimum battle score and relative aircraft number for each aircraft.

Interpolation Routine (INTRP)

INPUT: INTRP shall require access to the buffer pointer table. The buffer pointer table shall be used to access the buffers containing the present (time t) and future (t+1) data frame pair for each aircraft. From each aircraft the following parameters shall be referenced:
- X position at times t and t+1

Y position at times t and t+1
Z position at times t and t+1
Pitch at times t and t+1
Roll at times t and t+1
Yaw at times t and t+1
Buffer index range for data refill
Number of aircraft being processed PROCESSING: The interpolation routine shall be invoked during pass two of the analytic program. Using a straight line interpolation method between the present and future value of each parameter, the data rate shall be increased from five data frames per second to fifteen data frames per second. The above parameters are interpolated because they are critical to the display.

First, the difference ($\Delta$) is calculated between the future and present value for each parameter. Special calculations for the change in roll, pitch, and yaw ($\Delta$) are required if these values cross from the 180° to −180° boundary or vise versa. An interpolation factor shall be calculated for each parameter by dividing $\Delta$ by three. The interpolation factor shall be added to the original value to generate the value at t+1/15. Then twice the interpolation factor shall be added to the original value to generate the value at t+2/15. Therefore, the present data frame (time t) shall contain three values for each of the parameters listed above.

Within INTRP, roll and pitch shall be checked for wild point values. A wild point value shall be detected if one or more of the following conditions exist:

$\Delta$pitch$>20°$ and pitch$_t<150°$
$\Delta$pitch$>-20°$ and pitch$>-150°$
$\Delta$roll$<20°$ and roll$_t<150°$
$\Delta$roll$<-20°$ and roll$_t>-150°$ If a wild point value is detected, the $\Delta$ value for that parameter shall be set to zero, and the value in the future buffer shall be changed to the value in the present buffer. Therefore, all three values of the parameter in the present data frame, the original and the two interpolated values, shall be equal.

All roll, pitch, and yaw values shall be normalized to values between +180°.

For the next invocation of INTRP, the buffer pointer table shall be updated in order that the buffers containing the future data frames shall be accessed as the present data frames and the buffers which had contained present data frames shall be refilled and accessed as future data frames. The buffer index refill range shall be set in order that the proper buffers shall be refilled with new data.

OUTPUT: The parameters modified or generated by INTRP are given below:
Arrays for each aircraft containing
X, Y, and Z position at times t, t+1/15, t+2/15
Roll for times t, t+1/15, t+2/15
Pitch for times t, t+1/15, t+2/15
Yaw for times t, t+1/15, t+2/15
Modified buffer pointer table
Buffer index range for data refill

I claim:

1. A method of correcting data on an aircraft's position relative to the earth, said data being obtained during flight with an inertial navigation system (INS) on board said aircraft, comprising the steps of:

prior to commencing an aircraft engagement, determining the pre-engagement position of said aircraft relative to the earth independently of said INS, at said pre-engagement position, operating said INS to obtain pre-engagement INS data on the position of said aircraft relative to the earth, recording said pre-engagement INS data on position obtained by said INS at said pre-engagement position, flying said aircraft in an engagement, during said engagement of said aircraft continuing to operate said INS to obtain INS data on the position of said aircraft relative to the earth, recording the INS data obtained on position during said engagement, after the termination of said engagement by said aircraft, determining the post-engagement position of sad aircraft relative to the earth independently of said INS, at said post-engagement position, operating said INS to obtain post-engagement INS data on the position of said aircraft relative to the earth, recording said post-engagement INS data on position obtained by said INS at said post-engagement position, comparing said independently determined pre-engagement position of said aircraft with the pre-engagement INS data on position to obtain pre-engagement error functions of position, comparing said independently determined post-engagement position of said aircraft with the post-engagement INS data on position to obtain post-engagement error functions of position.

employing said pre-engagement error functions of position, said post-engagement error functions of position and the known time-variant drift characteristics of position of said INS to derive position correction functions during said engagement, employing said position correction functions to correct the recorded INS data obtained on position during said engagement to obtain corrected INS data on position during said engagement, and storing said corrected INS data on position.

2. A method of correcting data on an aircraft's position and velocity relative to the earth said data being obtained during flight with an inertial navigation system (INS) on board said aircraft, comprising the steps of:

prior to commencing an aircraft engagement, determining the pre-engagement position and velocity of said aircraft relative to the earth independently of said INS, at said pre-engagement position, operating said INS to obtain pre-engagement INS data on the position and velocity of said aircraft relative to the earth, recording said pre-engagement INS data on position and velocity obtained by said INS at said pre-engagement position, flying said aircraft in an engagement, during said engagement of said aircraft continuing to operate said INS to obtain INS data on the position and velocity of said aircraft relative to the earth, recording the INS data obtained on position and velocity during said engagement, after the termination of said engagement by said aircraft, determining the post-engagement position and velocity of said aircraft relative to the earth independently of said INS, at said post-engagement position, operating said INS to obtain post-engagement INS data on the position and velocity of said aircraft relative to the earth, recording said post-engagement INS data on position and velocity obtained by said INS at said post-engagement position, comparing said independently determined pre-engagement position and velocity of said aircraft with the pre-engagement INS data on position and velocity, respectively, to obtain pre-engagement error functions of position and velocity, comparing said independently determined post-engagement position and velocity of said aircraft with the post-engagement INS data on position and velocity to obtain post-engagement error functions of position and velocity, employing said pre-engagement error functions of position and velocity, said post-engagement error functions of position and velocity and the known time-variant drift characteristics of position and velocity of said INS to derive position and velocity correction functions during the time of said engagement, employing said position and velocity correction functions to correct the recorded INS data obtained on position and velocity, respectively, during said engagement to obtain corrected INS data on position and velocity during said engagement, and storing said corrected INS data on position and velocity.

3. The method of claim 2 comprising the step of employing said stored corrected INS data on position and velocity to display post-flight the position of said aircraft during said engagement relative to background portrayals of features or terrain on the earth.

4. The method of claim 2, wherein:
said pre-engagement position and velocity of said aircraft relative to the earth determined independently of said INS is determined while said aircraft is in flight,
said pre-engagement INS data on the position and velocity of said aircraft relative to the earth is obtained and recorded while said aircraft is in flight,
said post engagement position and velocity of said aircraft relative to the earth determined independently of said INS is determined while said aircraft is in flight,
said post-engagement INS data on the position and velocity of said aircraft relative to the earth is obtained and recorded while said aircraft is in flight.

5. A method of displaying more accurate visual portrayals of an aircraft's position relative to background portrayals of features or terrain on the earth during flight, said more accurate visual portrayals resulting from correction of data obtained during flight with an onboard inertial navigation system system (INS) comprising the steps of:
prior to commencing an aircraft engagement, determining the pre-engagement position of said aircraft relative to the earth independently of said INS,
at said pre-engagement position, operating said INS to obtain pre-engagement INS data on the position of said aircraft relative to the earth,
recording said pre-engagement INS data on position obtained by said INS at said pre-engagement position,
flying said aircraft in an engagement, during said engagement of said aircraft continuing to operate said INS to obtain INS data on the position of said aircraft relative to the earth, recording the INS data obtained on position during said engagement, after the termination of said engagement by said aircraft, determining the post-engagement position of said aircraft relative to the earth independently of said INS, at said post-engagement position, operating said INS to obtain post-engagement INS data on the position of said aircraft relative to the earth, recording said post-engagement INS data on position obtained by said INS at said post-engagement position, comparing said independently determined pre-engagement position of said aircraft with the pre-engagement INS data on position to obtain pre-engagement error functions of position, comparing said independently determined post-engagement position of said aircraft with the post-engagement INS data on position to obtain post-engagement error functions of position, employing said pre-engagement error functions of position, said post-engagement error functions of position and the known time-variant drift characteristics of position of said INS to derive position correction functions during the time of said engagement, employing said position correction functions to correct the recorded INS data obtained on position during said engagement to obtain corrected INS data on position during said engagement, storing said corrected INS data on position, and employing said stored corrected INS data on position to display post-flight the position of said aircraft during said engagement relative to background portrayals of features or terrain on the earth.

6. The method of claims 3 or 5 wherein said displaying is on the screen of a cathode ray tube.

7. The method of claims 3 or 5 wherein said displaying is produced by light image projection.

8. The method of claims 1 or 5, wherein:
said pre-engagement position of said aircraft relative to the earth determined independently of said INS is determined while said aircraft is in flight,
said pre-engagement INS data on the position of said aircraft relative to the earth is obtained and recorded while said aircraft is in flight,
said post-engagement position of said aircraft relative to the earth determined independently of said INS is determined whole said aircraft is in flight,
said post-engagement INS data on the position of said aircraft relative to the earth is obtained and recorded while said aircraft is in flight.

9. A method of correcting data on an aircraft's position relative to the earth, said data being obtained during flight with an inertial navigation system (INS) on board said aircraft, comprising the steps of:
prior to take off of said aircraft, locating said aircraft at a known pre-flight position,
at said known pre-flight position, commencing to operate said INS to obtain pre-flight INS data on position,
recording the pre-flight INS data on position obtained by said INS at said known pre-flight position, taking said aircraft off and flying said aircraft in an engagement, during said engagement of said aircraft, continuing to operate said INS to obtain INS data on position, during said engagement, recording the INS data obtained on position as a function of time with respect to the commencement of operation of said INS pre-flight, landing said aircraft and locating said aircraft at a known post-flight position, at said known post-flight position, continuing to operate said INS to obtain post-flight INS data on position, comparing the known aircraft position at said pre-flight position with the pre-flight INS data on position obtained to obtain pre-flight error functions of position, comparing the known aircraft position at said post-flight position with the post-flight INS data on position obtained to obtain post-flight error functions of position.

employing said pre-flight error functions on position, said post-flight error functions on position and the known time-variant drift characteristics of position of said INS to derive position correction functions during the time of said engagement, employing said position correction functions to correct the recorded INS data obtained on position during said engagement to obtain corrected INS data on position during said engagement, and storing said corrected INS data on position.

10. A method of correcting data on an aircraft's position and velocity relative to the earth, said data being obtained during flight with an inertial navigation system (INS) on board said aircraft, comprising the steps of:

prior to take off of said aircraft, locating said aircraft at a known pre-flight position, at said known pre-flight position, commencing to operate said INS to obtain pre-flight INS data on position and velocity, recording the pre-flight INS data on position and velocity obtained by said INS at said known pre-flight position, taking said aircraft off and flying said aricraft in an engagement, during said engagement, continuing to operate said INS to obtain INS data on position and velocity, during said engagement, recording the INS data obtained on position and velocity as a function of time with respect to the commencement of operation of said INS pre-flight, landing said aircraft and locating said aircraft at a known post-flight position, at said known post-flight position, continuing to operate said INS to obtain post-flight INS data on position and velocity, recording the post-flight INS data on position and velocity as obtained by said INS at said known post-flight position, comparing the known aircraft position and velocity at said pre-flight position with the pre-flight INS data on position and velocity obtained respectively to obtain pre-flight error functions of position and velocity, comparing the known aircraft position and velocity at said post-flight position with the post-flight INS data on position and velocity obtained respectively to obtain post-flight error functions of position and velocity, employing said pre-flight error functions on position and velocity, said post-flight error functions on position and velocity and the known time-variant drift characteristics of position and velocity of said INS to derive position and velocity correction functions during the time of said engagement, employing said position and velocity correction functions to correct the recorded INS data obtained on position and velocity, respectively, during said engagement to obtain corrected INS data on position and velocity during said engagement, and storing said corrected INS data on position and velocity.

11. The method of claim 10 comprising the step of employing said stored corrected INS data on position and velocity to display post-flight the position of said aircraft during said engagement relative to simulated background portrayals of features or terrain on the earth.

12. A method of displaying more accurate visual portrayals of an aircraft's position relative to background portrayals of features or terrain on the earth during flight, said more accurate visual portrayals resulting from correction of data obtained during flight with an on-board inertial navigation system (INS) comprising the steps of:

prior to take off of said aircraft, locating said aircraft at a known pre-flight position, at said known pre-flight position, commencing to operate said INS to obtain pre-flight INS data on position, recording the pre-flight INS data on position obtained by said INS at said known pre-flight position, taking said aircraft off and flying said aircraft in an engagement, during said engagement, continuing to operate said INS to obtain INS data on position, during said engagement, recording the INS data obtained on position as a function of time with respect to the commencement of operation of said INS pre-flight, landing said aircraft and locating said aircraft at a known post-flight position, at said known post-flight position, continuing to operate said INS to obtain post-flight INS data on position, recording the post-flight INS data on position as obtained by said INS at said known post-flight position, comparing the known aircraft position at said pre-flight position with the pre-flight INS data on position obtained to obtain pre-flight error functions of position, comparing the known aircraft position at said post-flight position with the post-flight INS data on position obtained to obtain post-flight error functions of position, employing said pre-flight error functions on position, said post-flight error functions on position and the known time-variant drift characteristics of position of said INS to derive position correction functions during the time of said engagement, employing said position correction functions to correct the recorded INS data obtained on position during said engagement to obtain corrected INS data on position during said engagement, storing said corrected INS data on position, and employing said stored corrected INS data on position to display post-flight the position of said aircaft during said engagement relative to background portrayals of features or terrain on the earth.

13. The method of claims 11 or 12 wherein said displaying is on the screen of a cathode ray tube.

14. The method of claims 11 or 12 wherein said displaying is produced by light image projection.

15. A method of correcting data on the position of two or more aircraft relative to the earth, said data being obtained during flight with an inertial navigation system (INS) on board each aircaft, one of said aircaft being designated as a reference aircraft, comprising the steps of:

prior to commencing an engagement, determining the pre-engagement position of each of said aircraft relative to the earth independently of said INS, at said pre-engagement position of each of said aircraft, operating said INS of each of said aircraft to obtain pre-engagement INS data on the position of each of said aircraft relative to the earth, recording said pre-engagement INS data on position obtained by each of said INS at said pre-engagement position of each of said aircraft, flying said aircraft in an engagement, during said engagement of said aircraft continuing to operate said INS of each of said aircraft to obtain INS data on the position of each of said aircraft relative to the earth, recording the INS data obtained on position by each of said INS during said engagement, during said engagement, at a time near a maneuver, determining the relative position of said other aircraft with respect to said reference aircraft, after the termination of said engagement by said aircraft, determining the post-engagement position of each of said aircraft relative to the earth independently of said INS, at said post-engagement position, operating said INS of each of said aircraft to obtain post-engagement INS data on the position of each of said aircraft relative to the earth, recording said post-engagement INS data on position obtained by each of said INS at said post-engagement position obtained by each of said aircraft, comparing said independently determined pre-engagement position of each of said aircraft with the pre-engagement INS data on position of each of said aircraft respectively to obtain pre-engagement error functions of position for each of said aircraft, comparing said independently determined post-engagement position of each of said aircraft with the post-engagement INS data on position of each of said aircraft to obtain post-engagement error functions of position for each of said aircraft, for each aircraft, employing said pre-engagement error functions of position of said aircraft, said post-engagement error functions of position of said aircraft and the known time-variant drift characteristics of position of said INS of said aircraft to derive position correction functions during the time of said engagement, for each aircraft, employing said position correction functions for said aircraft to correct the recorded INS data obtained on position for said aircaft during said engagement to obtain corrected INS data on position for said aircraft during said engagement, storing said corrected INS data on position of said reference aircraft, comparing said relative position of said other aircraft with said other aircraft's corrected INS data on the position of said other aircraft to obtain relative error functions, employing said relative error functions to further correct said corrected INS data on position for said other aircraft during said engagement, and storing said further corrected INS data on position for said other aircraft.

16. A method of correcting data on the position of two or more aircraft relative to the earth, said data being obtained during flight with an inertial navigation system (INS) on board each aircraft, comprising the steps of:

prior to commencing an engagement, determining the pre-engagement position of each of said aircraft relative to the earth independently of said INS, at said pre-engagement position of each of said aircraft, operating said INS of each of said aircraft to obtain pre-engagement INS data on the position of each of said aircraft relative to the earth, recording said pre-engagement INS data on position obtained by each of said INS at said pre-engagement position of each of said aircraft, flying said aircraft in an engagement, during said engagement of said aircraft continuing to operate said INS of each of said aircraft to obtain INS data on the position of each of said aircraft relative to the earth, recording the INS data obtained on position by each of said INS during said engagement, during said engagement, at a time near a maneuver, determining the relative position of each of said aircraft with respect to a known position on the earth, after the termination of said engagement by said aircraft, determining the post-engagement position of each of said aircraft relative to the earth independently of said INS, at said post-engagement position, operating said INS of each of said aircraft to obtain post-engagement INS data on the position of each of said aircraft relative to the earth, recording said post-engagement INS data on position obtained by each of said INS at said post-engagement position of each of said aircraft, comparing said independently determined pre-engagement position of each of said aircraft with the pre-engagement INS data on position of each of said aircraft respectively to obtain pre-engagement error functions of position for each of said aircraft, comparing said independently determined post-engagement position of each of said aircraft with the post-engagement INS data on position of each of said aircraft respectively to obtain post-engagement error functions of position for each of said aircraft, for each aircraft, employing said pre-engagement error functions of position of said aircraft, said post-engagement error functions of position of said aircraft and the known time-variant drift characteristics of position of said INS of said aircraft to derive position correction functions during the time of said engagement, for each aircraft, employing said position correction functions for said aircraft to correct the recorded INS data obtained on position for said aircraft during said engagement to obtain corrected INS data on position for said aircraft during said engagement, comparing said relative position of each of said aircraft with its corrected INS data on the position of said aircraft to obtain relative error functions for each of said aircraft, employing said relative error functions of each of said aircraft to further correct its corrected INS data on position during said engagement, and storing said further corrected INS data on position for each of said aircraft.

17. A method of correcting data on the position of two or more aircraft relative to the earth, said data being obtained during flight with an inertial navigation system (INS) on board each aircraft, one of said aircraft being designated as a reference aircraft, comprising the steps of:

prior to take off of said aircraft, locating each of said aircraft at a known pre-flight position respectively, at said known pre-flight position of each of said aircraft commencing to operate said INS of each of said aircraft to obtain pre-flight INS data on position for each of said aircraft, recording the pre-flight INS data on position obtained by each of said INS at said known pre-flight position of each of said aircraft, taking said aircraft off and flying said aircraft in an engagement, during said engagement, continuing to operate said INS of each of said aircraft to obtain INS data on the position of each of said aircraft relative to the earth, during said engagement, recording the INS data of each of said aircraft obtained on position as a function of time with respect to the commencement of operation of its INS pre-flight, during said engagement, at a time near a maneuver, determining the relative position of said other aircraft with respect to said reference aircraft, landing said aircraft and locating each of said aircraft at a known post-flight position, at said known post-flight position of each of said aircraft, continuing to operate said INS of each of said aircraft to obtain post-flight INS data on position for each of said aircraft, recording the post-flight INS data on position obtained by each of said INS at said known post-flight INS position of each of said aircraft, comparing the known aircraft position at said pre-flight position of each of said aircraft with its pre-flight INS data obtained on position to obtain pre-flight error functions of position for each aircraft, comparing the known aircraft position at said post-flight position of each of said aircraft with its post-flight INS data obtained on position to obtain post-flight error functions of position for each aircraft, for each aircraft, employing said pre-flight error functions of position of said aircraft, said post-flight error functions of position of said aircraft, and the known time-variant drift characteristics of position of the INS of said aircraft to derive position correction functions during the time of said engagement, for each aircraft, employing said position correction functions for said aircraft to correct the recorded INS data obtained on position for said aircraft during said engagement to obtain corrected INS data on position for said aircraft during said engagement, storing said corrected INS data on position of said reference aircraft, comparing said relative position of said other aircraft with its corrected INS data on the position of said other aircraft to obtain relative error functions, employing said relative error functions to further correct said corrected INS data on position for said other aircraft during said enagagement, and storing said further corrected INS data on position for said other aircraft.

18. The method of claims 15 or 17 comprising the step of:

employing said stored corrected INS data on position and said stored further corrected INS data on position to display post-flight the positions of said aircraft during said engagement relative to background portrayals of features or terrain on the earth.

19. The method of claim 17, comprising the steps of:

at said known pre-flight position of each of said aircraft, commencing to operate said INS of each of said aircraft to obtain pre-flight INS data on position and velocity for each of said aircraft, recording the pre-flight INS data on position and velocity obtained by each of said INS at said known pre-flight position of each of said aircraft, during said engagement, continuing to operate said INS of each of said aircraft to obtain INS data on the position and velocity of each of said aircraft relative to the earth, during said engagement, recording the INS data of each of said aircraft obtained on position and velocity as a function of time with respect to the commencement of operation of its INS pre-flight, at said known post-flight position of each of said aircraft, continuing to operate said INS of each of said aircraft to obtain post-flight INS data on position and velocity for each of said aircraft, recording the post-flight INS data on position and velocity obtained by each of said INS at said known post-flight INS position of each of said aircraft, comparing the known aircraft position and velocity at said pre-flight position of each of said aircraft with its pre-flight INS data obtained on position and velocity respectively to obtain pre-flight error functions of position and velocity for each aircraft, comparing the known aircraft position and velocity at said post-flight position of each of said aircraft with its post-flight INS date obtained on position and velocity respectively to obtain post-flight error functions of position and velocity for each aircraft, for each aircraft, employing said pre-flight error functions of position and velocity of said aircraft, said post-flight error functions of position and velocity of said aircraft, and the known time-variant drift characteristics of position and velocity of the INS of said aircraft to derive position and velocity correction functions during the time of said engagement, for each aircraft, employing said position and velocity correction functions for said aircraft to correct the recorded INS data obtained on position and velocity for said aircraft during said engagement to obtain corrected INS data on position and velocity for said aircraft during said engagement, storing said corrected INS data on position and velocity of said reference aircraft, comparing said relative position of said other aircraft with its corrected INS data on the position of said other aircraft to obtain relative error functions, employing said relative error functions to further correct said corrected INS data on position for said other aircraft during said engagement, and storing said further corrected INS data on position for said other aircraft.

20. A method of correcting data on the position of two or more aircraft relative to the earth, said data being obtained during flight with an inertial navigation system (INS) on board each aircraft, comprising the steps of:

prior to take off of said aircraft, locating each of said aircraft at a known pre-flight position respectively, at said known pre-flight position of each of said aircraft, commencing to operate said INS of each of said aircraft to obtain pre-flight INS data on position for each of said aircraft, recording the pre-flight INS data on position obtained by each of said INS at said known pre-flight position of each of said aircraft, taking said aircraft off and flying said aircraft in an engagement, during said engagement, continuing to operate said INS of each of said aircraft to obtain INS data on the position of each of said aircraft relative to the earth, during said engagement, recording the INS data of each of said aircraft obtained on position as a function of time with respect to the commencement of operation of its INS pre-flight, during said engagement, at a time near a maneuver, determining the relative position of each of said aircraft with respect to a known position on the earth, landing said aircraft and locating each of said aircraft at a known post-flight position, at said known post-flight positon of each of said aircraft, continuing to operate said INS of each of said aircraft to obtain post-flight INS data on position for each of said aircraft, recording the post-flight INS data on position obtained by each of said INS at said known post-flight INS position of each of said aircraft, comparing the known aircraft position at said pre-flight position of each of said aircraft with its pre-flight INS data obtained on position to obtain pre-flight error functions of position for each aircraft, comparing the known aircraft position at said post-flight position of each of said aircraft with its post-flight INS data obtained on position to obtain post-flight error functions of position, for each aircraft, employing said pre-flight error functions of position of said aircraft, said post-flight error functions of position of said aircraft, and the known time-variant drift characteristics of position of the INS of said aircraft to derive position correction functions during the time of said flight exercise, for each aircraft, employing said position correction functions for said aircraft to correct the recorded INS data obtained on position for said aircraft during said engagement to obtain corrected INS data on position for said aircraft during said engagement, comparing said relative position of each of said aircraft with its corrected INS data on the position of said aircraft to obtain relative error functions for each of said aircraft, employing said relative error functions of each of said aircraft to further correct its corrected INS data on position during said engagement, and storing said further corrected INS data on position for each of said aircraft.

21. The method of claims 16 or 20 comprising the step of:

employing said stored corrected INS data on position to display post-flight the positions of said aircraft during said engagement relative to background portrayals of features or terrain on the earth.

22. The method of claim 20, comprising the steps of:

at said known pre-flight position of each of said aircraft, commencing to operate said INS of each of said aircraft to obtain pre-flight INS data on position and velocity for each of said aircraft, recording the pre-flight INS data on position and velocity obtained by each of said INS at said known pre-flight position of each of said aircraft, during said engagement, continuing to operate said INS of each of said aircraft to obtain INS data on the position and velocity of each of said aircraft relative to the earth, during said engagement, recording the INS data of each of said aircraft obtained on position and velocity as a function of time with respect to the commencement of operation of its INS pre-flight, at said known post-flight position of each of said aircraft, continuing to operate said INS of each of said aircraft to obtain post-flight INS data on position and velocity for each of said aircraft, recording the post-flight INS data on position and velocity obtained by each of said INS at said known post-flight INS position of each of said aircraft, comparing the known aircraft position and velocity at said pre-flight position of each of said aircraft with its pre-flight INS data obtained on position and velocity respectively to obtain pre-flight error functions of position and velocity for each aircraft, comparing the known aircraft position and velocity at said post-flight position of each of said aircraft with its post-flight INS data obtained on position and velocity respectively to obtain post-flight error functions of position and velocity, for each aircraft, employing said pre-flight error functions of position and velocity of said aircraft, said post-flight error functions of position and velocity of said aircraft, and the known time-variant drift characteristics of position and velocity of the INS of said aircraft to derive position and velocity correction functions during the time of said engagement, for each aircraft, employing said position and velocity correction functions for said aircraft to correct the recorded INS data obtained on position and velocity for said aircraft during said engagement to obtain corrected INS data on position and velocity for said aircraft during said engagement, comparing said relative position of each of said aircraft with its corrected INS data on the position of said aircraft to obtain relative error functions for each of said aircraft, employing said relative error functions of each of said aircraft to further correct its corrected INS data on position during said engagement, and storing said further corrected INS data on position for each of said aircraft.

23. A method of correcting data on a vehicle's position relative to the earth, said data being obtained during a mission with an inertial navigation system (INS) on board said vehicle, comprising the steps of:

prior to commencing an engagement, determining the pre-engagement position of said vehicle relative to the earth independently of said INS, at said pre-engagement position, operating said INS to obtain pre-engagement INS data on the position of said vehicle relative to the earth, recording said pre-engagement INS data on position obtained by said INS at said pre-engagement position, engaging said vehicle in an engagement, during said engagement of said vehicle continuing to operate said INS to obtain INS data on the position of said vehicle relative to the earth, recording the INS data obtained on position during said engagement, after the termination of said engagement by said vehicle, determining the post-engagement position of said vehicle relative to the earth independently of said INS, at said post-engagement position, operating said INS to obtain post-engagement INS data on the position of said vehicle relative to the earth, recording said post-engagement INS data on position obtained by said INS at said post-engagement position, comparing said independently determined pre-engagement position of said vehicle with the pre-engagement INS data on position to obtain pre-engagement error functions of position, comparing said independently determined post-engagement position of said vehicle with the post-engagement INS data on position to obtain post-engagement error functions of position, employing said pre-engagement error functions of position; said post-engagement error functions of position and the known time-variant drift characteristics of position of said INS to derive position correction functions during said engagement, employing said position correction functions to correct the recorded INS data obtained on position during said engagement to obtain corrected INS data on position during said engagement, and storing said corrected INS data on position.

* * * * *